US012748665B1

(12) United States Patent
Anwar et al.

(10) Patent No.: US 12,748,665 B1
(45) Date of Patent: Sep. 29, 2026

(54) PERFORMING MAINTENANCE ON SEARCH HEADS OF A DATA INTAKE AND QUERY SYSTEM WITH MINIMAL PERFORMANCE IMPACT

(71) Applicant: Cisco Technology, Inc., San Jose, CA (US)

(72) Inventors: Tameem Anwar, Dublin, CA (US); Weichao Duan, San Jose, CA (US); Tianyi Gou, San Francisco, CA (US); Ashish Mathew, Santa Clara, CA (US); Sai Krishna Sajja, Dublin, CA (US); Anton Tsviatkou, Sunnyvale, CA (US)

(73) Assignee: Cisco Technology, Inc., San Jose, WA (US)

( * ) Notice: Subject to any disclaimer, the term of this patent is extended or adjusted under 35 U.S.C. 154(b) by 172 days.

(21) Appl. No.: 18/597,674

(22) Filed: Mar. 6, 2024

(51) Int. Cl.
*G06F 11/14* (2026.01)
*G06F 11/34* (2006.01)

(52) U.S. Cl.
CPC ...... *G06F 11/1433* (2013.01); *G06F 11/1425* (2013.01); *G06F 11/3419* (2013.01); *G06F 2201/815* (2013.01)

(58) Field of Classification Search
CPC ............. G06F 11/1425; G06F 11/1433; G06F 11/3419; G06F 2201/815
See application file for complete search history.

(56) References Cited

U.S. PATENT DOCUMENTS

| | | | | |
|---|---|---|---|---|
| 7,937,344 | B2 | 5/2011 | Baum et al. | |
| 8,112,425 | B2 * | 2/2012 | Baum | G06F 16/2477 707/746 |
| 8,751,529 | B2 | 6/2014 | Zhang et al. | |
| 8,788,525 | B2 | 7/2014 | Neels et al. | |
| 9,215,240 | B2 | 12/2015 | Merza et al. | |
| 9,286,413 | B1 | 3/2016 | Coates et al. | |
| 10,127,258 | B2 | 11/2018 | Lamas et al. | |
| 11,567,672 | B2 * | 1/2023 | Shelke | G06F 11/1433 |
| 12,141,040 | B1 * | 11/2024 | Bhattacharyya | G06F 11/2025 |
| 2018/0373521 | A1 * | 12/2018 | Huang | H04L 67/34 |

(Continued)

OTHER PUBLICATIONS

Splunk Enterprise 8.0.0 Overview, available online, retrieved May 20, 2020 from docs.splunk.com.

(Continued)

*Primary Examiner* — Marina Lee
(74) *Attorney, Agent, or Firm* — Shook, Hardy & Bacon L.L.P.

(57) ABSTRACT

A computer-implemented method for performing maintenance on components of a data intake and query system is disclosed. The method includes determining a configuration of one or more search heads in the data intake and query system to be upgraded. Responsive to a determination that the one or more search heads comprises a plurality of search heads arranged in a first cluster, the method includes performing a rolling upgrade process for the one or more search heads in the plurality of search heads. Further, responsive to a determination that the one or more search heads comprises a single search head, the method includes adding additional search heads to the configuration with the single search head to form a second cluster and performing a rolling upgrade process for the search heads in the second cluster.

20 Claims, 9 Drawing Sheets

(56) References Cited

U.S. PATENT DOCUMENTS

| | | | |
|---|---|---|---|
| 2019/0098106 A1 | 3/2019 | Mungel et al. | |
| 2019/0207866 A1* | 7/2019 | Pathak | H04L 41/22 |
| 2019/0253487 A1 | 8/2019 | Smith et al. | |
| 2020/0150946 A1 | 5/2020 | Olderdissen et al. | |
| 2021/0342337 A1 | 11/2021 | Lu et al. | |
| 2023/0030546 A1 | 2/2023 | Forrest et al. | |
| 2023/0153108 A1 | 5/2023 | Shukla et al. | |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

360

600

800

PERFORMING MAINTENANCE ON SEARCH HEADS OF A DATA INTAKE AND QUERY SYSTEM WITH MINIMAL PERFORMANCE IMPACT

BACKGROUND

Information technology (IT) environments can include diverse types of data systems that store large amounts of diverse data types generated by numerous devices. For example, a big data ecosystem may include databases, such as MYSQL and ORACLE databases, cloud computing services, such as AMAZON WEB SERVICES (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, or to derive other insights.

The amount and diversity of data systems containing structured, semi-structured, or unstructured data relevant to any search query can be massive and continues to grow rapidly. This technological evolution gives rise to various challenges in relation to managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of data on diverse data systems provides opportunities to derive new insights, it also gives rise to technical challenges in storing, searching, and analyzing the data in a performant way.

One notable technical challenge is mitigating impact to customer searches and business activities on an information technology platform during maintenance and upgrade activities. In conventional information technology platforms, there is a significant loss in search performance during a maintenance window or during an upgrade. Loss in search performance is undesirable and, often, unacceptable for certain clients. Accordingly, this is a significant challenge for providers of a data intake and query system.

BRIEF DESCRIPTION OF THE DRAWINGS

Illustrative examples are described in detail below with reference to the following figures.

DETAILED DESCRIPTION

Figure 1:
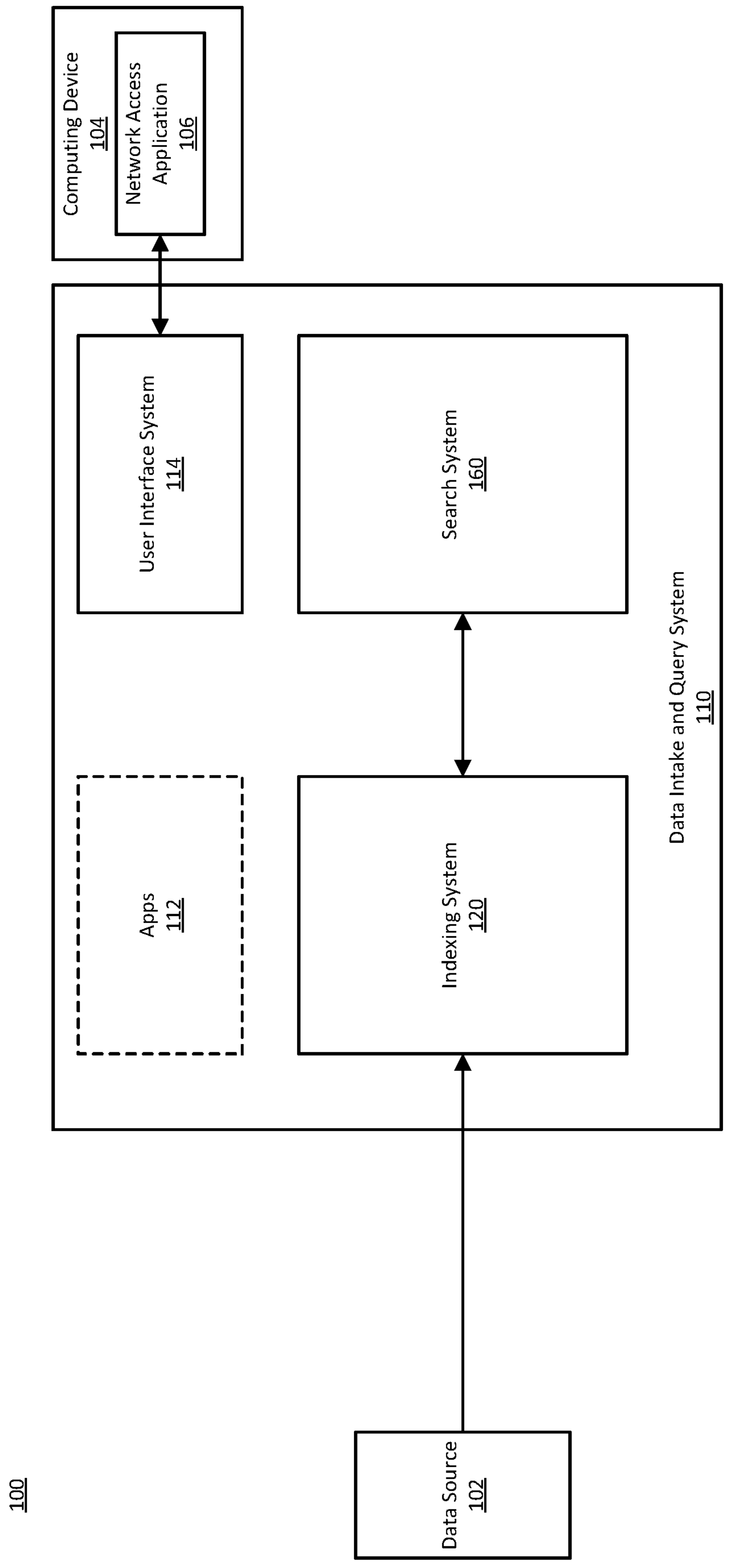
FIG. 1 is a block diagram illustrating an example computing environment that includes a data intake and query system.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

FIG. 1 is a block diagram illustrating an example computing environment 100 that includes a data intake and query system 110. The data intake and query system 110 obtains data from a data source 102 in the computing environment 100, and ingests the data using an indexing system 120. A search system 160 of the data intake and query system 110 enables users to navigate the indexed data. Though drawn with separate boxes in FIG. 1, in some implementations the indexing system 120 and the search system 160 can have overlapping components. A computing device 104, running a network access application 106, can communicate with the data intake and query system 110 through a user interface system 114 of the data intake and query system 110. Using the computing device 104, a user can perform various operations with respect to the data intake and query system 110, such as administration of the data intake and query system 110, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 110 can further optionally include apps 112 that extend the search, analytics, and/or visualization capabilities of the data intake and query system 110.

The data intake and query system 110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 110 can be executed on a single computing device, or execution of the program code can be distributed over multiple computing devices. For example, the program code can include instructions for both indexing and search components (which may be part of the indexing system 120 and/or the search system 160, respectively), which can be executed on a computing device that also provides the data source 102. As another example, the program code can be executed on one computing device, where execution of the program code provides both indexing and search components, while another copy of the program code executes on a second computing device that provides the data source 102. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 102 of the computing environment 100 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 120 obtains machine data from the data source 102 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 120 does not require prior knowledge of the structure of incoming data (e.g., the indexing system 120 does not need to be provided with a schema describing the data). Additionally, the indexing system 120 retains a copy of the data as it was received by the indexing system 120 such that the original data is always available for searching (e.g., no data is discarded, though, in some examples, the indexing system 120 can be configured to do so).

The search system 160 searches the data stored by the indexing 120 system. As discussed in greater detail below, the search system 160 enables users associated with the computing environment 100 (and possibly also other users) to navigate the data, generate reports, and visualize search results in "dashboards" output using a graphical interface. Using the facilities of the search system 160, users can obtain insights about the data, such as retrieving events from an index, calculating metrics, searching for specific conditions within a rolling time window, identifying patterns in the data, and predicting future trends, among other examples. To achieve greater efficiency, the search system 160 can apply map-reduce methods to parallelize searching of large volumes of data. Additionally, because the original data is available, the search system 160 can apply a schema to the data at search time. This allows different structures to be applied to the same data, or for the structure to be modified if or when the content of the data changes. Application of a schema at search time may be referred to herein as a late-binding schema technique.

The user interface system 114 provides mechanisms through which users associated with the computing environment 100 (and possibly others) can interact with the data intake and query system 110. These interactions can include configuration, administration, and management of the indexing system 120, initiation and/or scheduling of queries that are to be processed by the search system 160, receipt or reporting of search results, and/or visualization of search results. The user interface system 114 can include, for example, facilities to provide a command line interface or a web-based interface.

Users can access the user interface system 114 using a computing device 104 that communicates with data intake and query system 110, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 100. For example, a person can log in as a particular user and, using the user's digital information, can access the data intake and query system 110. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 104 can provide a human-machine interface through which a person can have a digital presence in the computing environment 100 in the form of a user. The computing device 104 is an electronic device having one or more processors and a memory capable of storing instructions for execution by the one or more processors. The computing device 104 can further include input/output (I/O) hardware and a network interface. Applications executed by the computing device 104 can include a network access application 106, such as a web browser, which can use a network interface of the client computing device 104 to communicate, over a network, with the user interface system 114 of the data intake and query system 110. The user interface system 114 can use the network access application 106 to generate user interfaces that enable a user to interact with the data intake and query system 110. A web browser is one example of a network access application. A shell tool can also be used as a network access application. In some examples, the data intake and query system 110 is an application executing on the computing device 106. In such examples, the network access application 106 can access the user interface system 114 without going over a network.

The data intake and query system 110 can optionally include apps 112. An app of the data intake and query system 110 is a collection of configurations, knowledge objects (a user-defined entity that enriches the data in the data intake and query system 110), views, and dashboards that may provide additional functionality, different techniques for searching the data, and/or additional insights into the data. The data intake and query system 110 can execute multiple applications simultaneously. Example applications include an information technology service intelligence application, which can monitor and analyze the performance and behavior of the computing environment 100, and an enterprise security application, which can include content and searches to assist security analysts in diagnosing and acting on anomalous or malicious behavior in the computing environment 100.

Though FIG. 1 illustrates only one data source, in practical implementations, the computing environment 100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 100, the data intake and query system 110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 100 can include on-prem and cloud-based computing resources, or only cloud-based resources. For example, an entity may have on-prem computing devices and a private cloud. In this example, the entity operates the data intake and query system 110 and can choose to execute the data intake and query system 110 on an on-prem computing device or in the cloud. In another example, a provider entity operates the data intake and query system 110 in a public cloud and provides the functionality of the data intake and query system 110 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 110. In some implementations, the entity providing the data intake and query system 110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 110, and a third entity can subscribe to the services of the second provider entity in order to use the functionality of the data intake and query system 110. In this example, the data sources are associated with the third entity, users accessing the data intake and query system 110 are associated with the third entity, and the analytics and insights provided by the data intake and query system 110 are for purposes of the third entity's operations.

Figure 2:
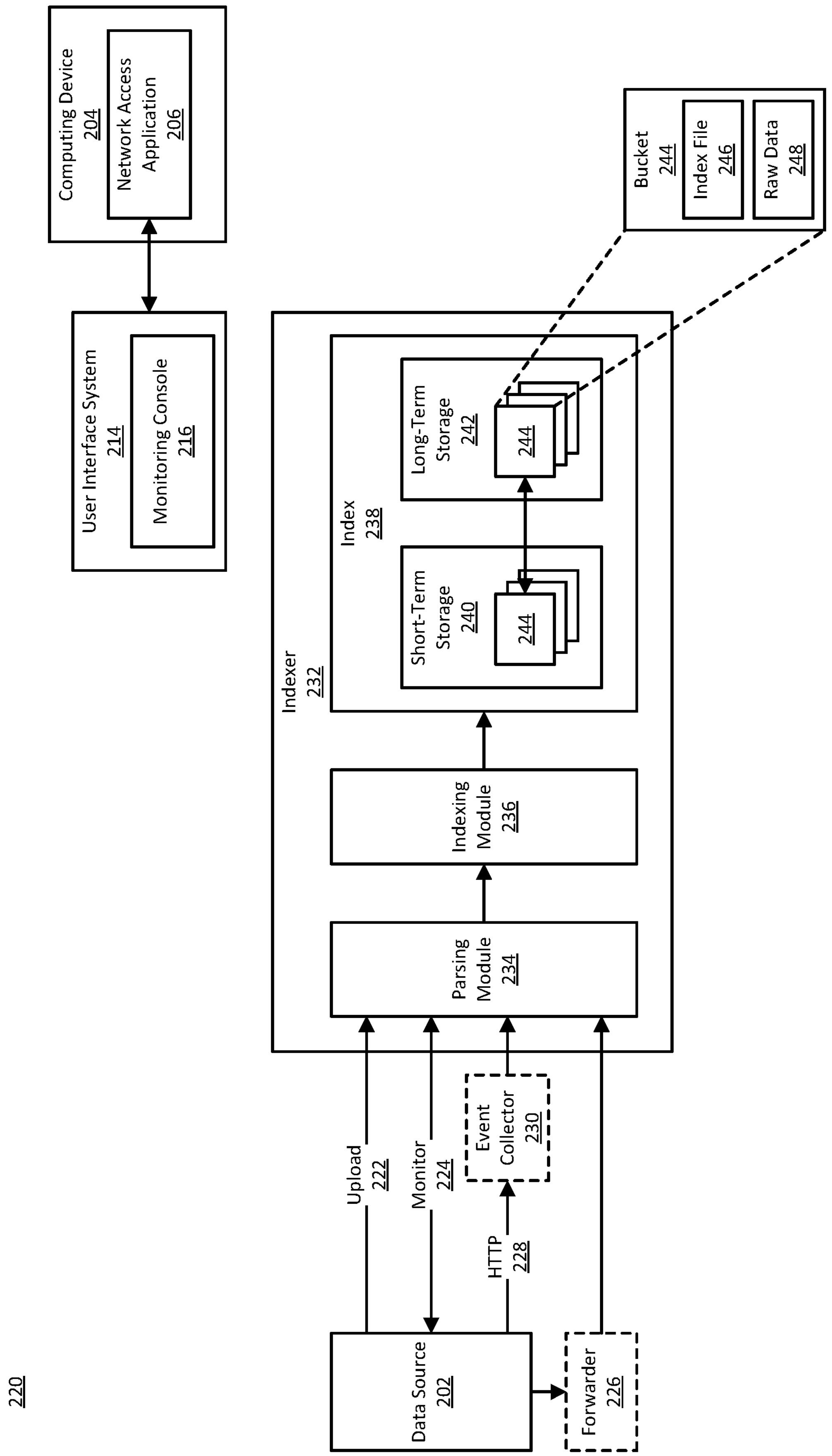
FIG. 2 is a block diagram illustrating in greater detail an example of an indexing system of a data intake and query system, such as the data intake and query system of FIG. 1.

FIG. 2 is a block diagram illustrating in greater detail an example of an indexing system 220 of a data intake and query system, such as the data intake and query system 110 of FIG. 1. The indexing system 220 of FIG. 2 uses various methods to obtain machine data from a data source 202 and stores the data in an index 238 of an indexer 232. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 220 enables the data intake and query system to obtain the machine data produced by the data source 202 and to store the data for searching and retrieval.

Users can administer the operations of the indexing system 220 using a computing device 204 that can access the indexing system 220 through a user interface system 214 of the data intake and query system. For example, the computing device 204 can be executing a network access application 206, such as a web browser or a terminal, through which a user can access a monitoring console 216 provided by the user interface system 214. The monitoring console 216 can enable operations such as: identifying the data source 202 for data ingestion; configuring the indexer 232 to index the data from the data source 232; configuring a data ingestion method; configuring, deploying, and managing clusters of indexers; and viewing the topology and performance of a deployment of the data intake and query system, among other operations. The operations performed by the indexing system 220 may be referred to as "index time" operations, which are distinct from "search time" operations that are discussed further below.

The indexer 232, which may be referred to herein as a data indexing component, coordinates and performs most of the index time operations. The indexer 232 can be implemented using program code that can be executed on a computing device. The program code for the indexer 232 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 232. In some implementations, the indexer 232 executes on the computing device 204 through which a user can access the indexing system 220. In some implementations, the indexer 232 executes on a different computing device than the illustrated computing device 204.

The indexer 232 may be executing on the computing device that also provides the data source 202 or may be executing on a different computing device. In implementations wherein the indexer 232 is on the same computing device as the data source 202, the data produced by the data source 202 may be referred to as "local data." In other implementations the data source 202 is a component of a first computing device and the indexer 232 executes on a second computing device that is different from the first computing device. In these implementations, the data produced by the data source 202 may be referred to as "remote data." In some implementations, the first computing device is "on-prem" and in some implementations the first computing device is "in the cloud." In some implementations, the indexer 232 executes on a computing device in the cloud and the operations of the indexer 232 are provided as a service to entities that subscribe to the services provided by the data intake and query system.

For a given data produced by the data source 202, the indexing system 220 can be configured to use one of several methods to ingest the data into the indexer 232. These methods include upload 222, monitor 224, using a forwarder 226, or using HyperText Transfer Protocol (HTTP 228) and an event collector 230. These and other methods for data ingestion may be referred to as "getting data in" (GDI) methods.

Using the upload 222 method, a user can specify a file for uploading into the indexer 232. For example, the monitoring console 216 can include commands or an interface through which the user can specify where the file is located (e.g., on which computing device and/or in which directory of a file system) and the name of the file. The file may be located at the data source 202 or may be on the computing device where the indexer 232 is executing. Once uploading is initiated, the indexer 232 processes the file, as discussed further below. Uploading is a manual process and occurs when instigated by a user. For automated data ingestion, the other ingestion methods are used.

The monitor 224 method enables the indexing system 202 to monitor the data source 202 and continuously or periodically obtain data produced by the data source 202 for ingestion by the indexer 232. For example, using the monitoring console 216, a user can specify a file or directory for monitoring. In this example, the indexing system 202 can execute a monitoring process that detects whenever the file or directory is modified and causes the file or directory contents to be sent to the indexer 232. As another example, a user can specify a network port for monitoring. In this example, a monitoring process can capture data received at or transmitting from the network port and cause the data to be sent to the indexer 232. In various examples, monitoring can also be configured for data sources such as operating system event logs, performance data generated by an operating system, operating system registries, operating system directory services, and other data sources.

Monitoring is available when the data source 202 is local to the indexer 232 (e.g., the data source 202 is on the computing device where the indexer 232 is executing). Other data ingestion methods, including forwarding and the event collector 230, can be used for either local or remote data sources.

A forwarder 226, which may be referred to herein as a data forwarding component, is a software process that sends data from the data source 202 to the indexer 232. The forwarder 226 can be implemented using program code that can be executed on the computer device that provides the data source 202. A user launches the program code for the forwarder 226 on the computing device that provides the data source 202. The user can further configure the forwarder 226, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 226 can provide various capabilities. For example, the forwarder 226 can send the data unprocessed or can perform minimal processing on the data before sending the data to the indexer 232. Minimal processing can include, for example, adding metadata tags to the data to identify a source, source type, and/or host, among other information, dividing the data into blocks, and/or applying a timestamp to the data. In some implementations, the forwarder 226 can break the data into individual events (event generation is discussed further below) and send the events to a receiver. Other operations that the forwarder 226 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 230 provides an alternate method for obtaining data from the data source 202. The event collector 230 enables data and application events to be sent to the indexer 232 using HTTP 228. The event collector 230 can be implemented using program code that can be executed on a computing device. The program code may be a component of the data intake and query system or can be a standalone component that can be executed independently of the data intake and query system and operates in cooperation with the data intake and query system.

To use the event collector 230, a user can, for example using the monitoring console 216 or a similar interface provided by the user interface system 214, enable the event collector 230 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 202 as an alternative method to using a username and password for authentication.

To send data to the event collector 230, the data source 202 is supplied with a token and can then send HTTP 228 requests to the event collector 230. To send HTTP 228 requests, the data source 202 can be configured to use an HTTP client and/or to use logging libraries such as those supplied by Java, JavaScript, and .NET libraries. An HTTP client enables the data source 202 to send data to the event collector 230 by supplying the data, and a Uniform Resource Identifier (URI) for the event collector 230 to the HTTP client. The HTTP client then handles establishing a connection with the event collector 230, transmitting a request containing the data, closing the connection, and receiving an acknowledgment if the event collector 230 sends one. Logging libraries enable HTTP 228 requests to the event collector 230 to be generated directly by the data source. For example, an application can include or link a logging library, and through functionality provided by the logging library manage establishing a connection with the event collector 230, transmitting a request, and receiving an acknowledgement.

An HTTP 228 request to the event collector 230 can contain a token, a channel identifier, event metadata, and/or event data. The token authenticates the request with the event collector 230. The channel identifier, if available in the indexing system 220, enables the event collector 230 to segregate and maintain separate data from different data sources. The event metadata can include one or more key-value pairs that describe the data source 202 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 230 extracts events from HTTP 228 requests and sends the events to the indexer 232. The event collector 230 can further be configured to send events to one or more indexers. Extracting the events can include associating any metadata in a request with the event or events included in the request. In these implementations, event generation by the indexer 232 (discussed further below) is bypassed, and the indexer 232 moves the events directly to indexing. In some implementations, the event collector 230 extracts event data from a request and outputs the event data to the indexer 232, and the indexer generates events from the event data. In some implementations, the event collector 230 sends an acknowledgement message to the data source 202 to indicate that the event collector 230 has received a particular request form the data source 202, and/or to indicate to the data source 202 that events in the request have been added to an index.

The indexer 232 ingests incoming data and transforms the data into searchable knowledge in the form of events. In the data intake and query system, an event is a single piece of data that represents activity of the component represented in FIG. 2 by the data source 202. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 232 can include a parsing module 234 and an indexing module 236 for generating and storing the events. The parsing module 234 and indexing module 236 can be modular and pipelined, such that one component can be operating on a first set of data while the second component is simultaneously operating on a second sent of data. Additionally, the indexer 232 may at any time have multiple instances of the parsing module 234 and indexing module 236, with each set of instances configured to simultaneously operate on data from the same data source or from different data sources. The parsing module 234 and indexing module 236 are illustrated in FIG. 2 to facilitate discussion, with the understanding that implementations with other components are possible to achieve the same functionality.

The parsing module 234 determines information about incoming event data, where the information can be used to identify events within the event data. For example, the parsing module 234 can associate a source type with the event data. A source type identifies the data source 202 and describes a possible data structure of event data produced by the data source 202. For example, the source type can indicate which fields to expect in events generated at the data source 202 and the keys for the values in the fields, and possibly other information such as sizes of fields, an order of the fields, a field separator, and so on. The source type of the data source 202 can be specified when the data source 202 is configured as a source of event data. Alternatively, the parsing module 234 can determine the source type from the event data, for example from an event field in the event data or using machine learning techniques applied to the event data.

Other information that the parsing module 234 can determine include timestamps. In some cases, an event includes a timestamp as a field, and the timestamp indicates a point in time when the action represented by the event occurred or was recorded by the data source 202 as event data. In these cases, the parsing module 234 may be able to determine from the source type associated with the event data that the timestamps can be extracted from the events themselves. In some cases, an event does not include a timestamp and the parsing module 234 determines a timestamp for the event, for example from a name associated with the event data from the data source 202 (e.g., a file name when the event data is in the form of a file) or a time associated with the event data (e.g., a file modification time). As another example, when the parsing module 234 is not able to determine a timestamp from the event data, the parsing module 234 may use the time at which it is indexing the event data. As another example, the parsing module 234 can use a user-configured rule to determine the timestamps to associate with events.

The parsing module 234 can further determine event boundaries. In some cases, a single line (e.g., a sequence of characters ending with a line termination) in event data represents one event while in other cases, a single line represents multiple events. In yet other cases, one event may span multiple lines within the event data. The parsing module 234 may be able to determine event boundaries from the source type associated with the event data, for example from a data structure indicated by the source type. In some implementations, a user can configure rules the parsing module 234 can use to identify event boundaries.

The parsing module 234 can further extract data from events and possibly also perform transformations on the events. For example, the parsing module 234 can extract a set of fields (key-value pairs) for each event, such as a host or hostname, source or source name, and/or source type. The parsing module 234 may extract certain fields by default or based on a user configuration. Alternatively or additionally, the parsing module 234 may add fields to events, such as a source type or a user-configured field. As another example of a transformation, the parsing module 234 can anonymize fields in events to mask sensitive information, such as social security numbers or account numbers. Anonymizing fields can include changing or replacing values of specific fields. The parsing component 234 can further perform user-configured transformations.

The parsing module 234 outputs the results of processing incoming event data to the indexing module 236, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 232 can be configured to identify searchable segments that are parts of fields, searchable segments that are entire fields, or both. The parsing module 234 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 246, to find event data that matches a search query. In some implementations, segmentation can alternatively be performed by the forwarder 226. Segmentation can also be disabled, in which case the indexer 232 will not build a lexicon for the event data. When segmentation is disabled, the search system searches the event data directly.

Building index data structures generates the index 238. The index 238 is a storage data structure on a storage device (e.g., a disk drive or other physical device for storing digital data). The storage device may be a component of the computing device on which the indexer 232 is operating (referred to herein as local storage) or may be a component of a different computing device (referred to herein as remote storage) that the indexer 238 has access to over a network. The indexer 232 can manage more than one index and can manage indexes of different types. For example, the indexer 232 can manage event indexes, which impose minimal structure on stored data and can accommodate any type of data. As another example, the indexer 232 can manage metrics indexes, which use a highly structured format to handle the higher volume and lower latency demands associated with metrics data.

The indexing module 236 organizes files in the index 238 in directories referred to as buckets. The files in a bucket 244 can include raw data files, index files, and possibly also other metadata files. As used herein, "raw data" means data as when the data was produced by the data source 202, without alteration to the format or content. As noted previously, the parsing component 234 may add fields to event data and/or perform transformations on fields in the event data. Event data that has been altered in this way is referred to herein as enriched data. A raw data file 248 can include enriched data, in addition to or instead of raw data. The raw data file 248 may be compressed to reduce disk usage. An index file 246, which may also be referred to herein as a "time-series index" or tsidx file, contains metadata that the indexer 232 can use to search a corresponding raw data file 248. As noted above, the metadata in the index file 246 includes a lexicon of the event data, which associates each unique keyword in the event data with a reference to the location of event data within the raw data file 248. The keyword data in the index file 246 may also be referred to as an inverted index. In various implementations, the data intake and query system can use index files for other purposes, such as to store data summarizations that can be used to accelerate searches.

A bucket 244 includes event data for a particular range of time. The indexing module 236 arranges buckets in the index 238 according to the age of the buckets, such that buckets for more recent ranges of time are stored in short-term storage 240 and buckets for less recent ranges of time are stored in long-term storage 242. Short-term storage 240 may be faster to access while long-term storage 242 may be slower to access. Buckets may be moved from short-term storage 240 to long-term storage 242 according to a configurable data retention policy, which can indicate at what point in time a bucket is old enough to be moved.

A bucket's location in short-term storage 240 or long-term storage 242 can also be indicated by the bucket's status. As an example, a bucket's status can be "hot," "warm," "cold," "frozen," or "thawed." In this example, hot bucket is one to which the indexer 232 is writing data and the bucket becomes a warm bucket when the index 232 stops writing data to it. In this example, both hot and warm buckets reside in short-term storage 240. Continuing this example, when a warm bucket is moved to long-term storage 242, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 220 can include more than one indexer, where a group of indexers is referred to as an index cluster. The indexers in an index cluster may also be referred to as peer nodes. In various embodiments, in an index cluster, the indexers are configured to replicate each other's data by copying buckets from one indexer to another. The number of copies of a bucket can be configured (e.g., three copies of each bucket must exist within the cluster), and indexers to which buckets are copied may be selected to optimize distribution of data across the cluster.

A user can view the performance of the indexing system 220 through the monitoring console 216 provided by the user interface system 214. Using the monitoring console 216, the user can configure and monitor an index cluster, and see information such as disk usage by an index, volume usage by an indexer, index and volume size over time, data age, statistics for bucket types, and bucket settings, among other information.

Figure 3:
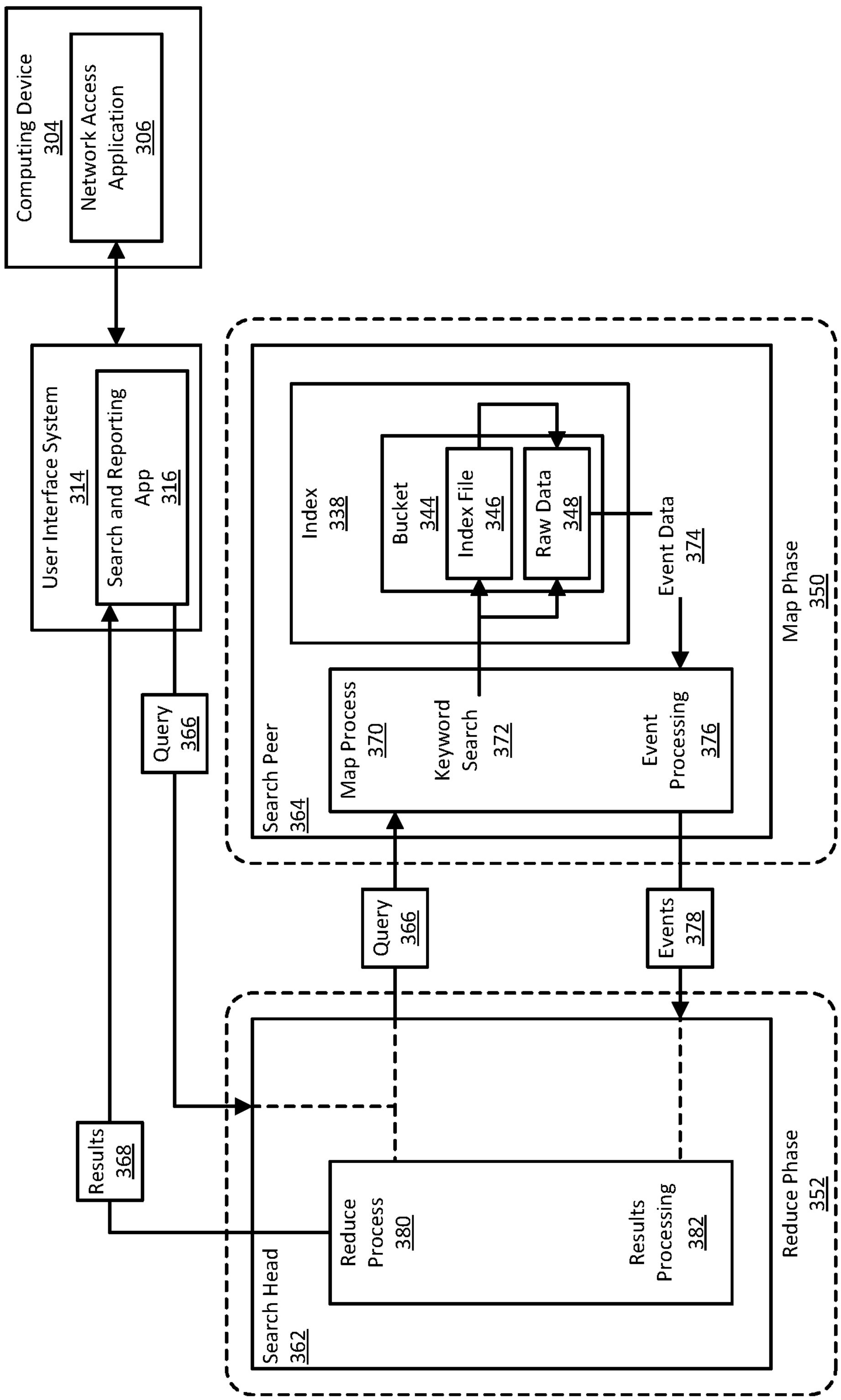
FIG. 3 is a block diagram illustrating in greater detail an example of the search system of a data intake and query system, such as the data intake and query system of FIG. 1.

FIG. 3 is a block diagram illustrating in greater detail an example of the search system 360 of a data intake and query system, such as the data intake and query system 110 of FIG. 1. The search system 360 of FIG. 3 issues a query 366 to a search head 362, which sends the query 366 to a search peer 364. Using a map process 370, the search peer 364 searches the appropriate index 338 for events identified by the query 366 and sends events 378 so identified back to the search head 362. Using a reduce process 382, the search head 362 processes the events 378 and produces results 368 to respond to the query 366. The results 368 can provide useful insights about the data stored in the index 338. These insights can aid in the administration of information technology systems, in security analysis of information technology systems, and/or in analysis of the development environment provided by information technology systems.

The query 366 that initiates a search is produced by a search and reporting app 316 that is available through the user interface system 314 of the data intake and query system. Using a network access application 306 executing on a computing device 304, a user can input the query 366 into a search field provided by the search and reporting app 316. Alternatively or additionally, the search and reporting app 316 can include pre-configured queries or stored queries that can be activated by the user. In some cases, the search and reporting app 316 initiates the query 366 when the user enters the query 366. In these cases, the query 366 may be referred to as an "ad-hoc" query. In some cases, the search and reporting app 316 initiates the query 366 based on a schedule. For example, the search and reporting app 316 can be configured to execute the query 366 once per hour, once per day, at a specific time, on a specific date, or at some other time that can be specified by a date, time, and/or frequency. These types of queries may be referred to as scheduled queries.

The query 366 is specified using a search processing language. The search processing language includes commands or search terms that the search peer 364 will use to identify events to return in the search results 368. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 366 to include sequential commands, where a subsequent command may operate on the results of a prior command. As an example, sequential commands may be separated in the query 366 by a vertical line ("I" or "pipe") symbol.

In addition to one or more search commands, the query 366 includes a time indicator. The time indicator limits searching to events that have timestamps described by the time indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 366 occurs in two broad phases: a map phase 350 and a reduce phase 352. The map phase 350 takes place across one or more search peers. In the map phase 350, the search peers locate event data that matches the search terms in the search query 366 and sorts the event data into field-value pairs. When the map phase 350 is complete, the search peers send events that they have found to one or more search heads for the reduce phase 352. During the reduce phase 352, the search heads process the events through commands in the search query 366 and aggregate the events to produce the final search results 368.

A search head, such as the search head 362 illustrated in FIG. 3, is a component of the search system 360 that manages searches. The search head 362, which may also be referred to herein as a search management component, can be implemented using program code that can be executed on a computing device. The program code for the search head 362 can be stored on a non-transitory computer-readable medium and from this medium can be loaded or copied to the memory of a computing device. One or more hardware processors of the computing device can read the program code from the memory and execute the program code in order to implement the operations of the search head 362.

Upon receiving the search query 366, the search head 362 directs the query 366 to one or more search peers, such as the search peer 364 illustrated in FIG. 3. "Search peer" is an alternate name for "indexer" and a search peer may be largely similar to the indexer described previously. The search peer 364 may be referred to as a "peer node" when the search peer 364 is part of an indexer cluster. The search peer 364, which may also be referred to as a search execution component, can be implemented using program code that can be executed on a computing device. In some implementations, one set of program code implements both the search head 362 and the search peer 364 such that the search head 362 and the search peer 364 form one component. In some implementations, the search head 362 is an independent piece of code that performs searching and no indexing functionality. In these implementations, the search head 362 may be referred to as a dedicated search head.

The search head 362 may consider multiple criteria when determining whether to send the query 366 to the particular search peer 364. For example, the search system 360 may be configured to include multiple search peers that each have duplicative copies of at least some of the event data and are implanted using different hardware resources. In this example, the sending the search query 366 to more than one search peer allows the search system 360 to distribute the search workload across different hardware resources. As another example, search system 360 may include different search peers for different purposes (e.g., one has an index storing a first type of data or from a first data source while a second has an index storing a second type of data or from a second data source). In this example, the search query 366 may specify which indexes to search, and the search head 362 will send the query 366 to the search peers that have those indexes.

To identify events 378 to send back to the search head 362, the search peer 364 performs a map process 370 to obtain event data 374 from the index 338 that is maintained by the search peer 364. During a first phase of the map process 370, the search peer 364 identifies buckets that have events that are described by the time indicator in the search query 366. As noted above, a bucket contains events whose timestamps fall within a particular range of time. For each bucket 344 whose events can be described by the time indicator, during a second phase of the map process 370, the search peer 364 performs a keyword search 374 using search terms specified in the search query 366. The search terms can be one or more of keywords, phrases, fields, Boolean expressions, and/or comparison expressions that in combination describe events being searched for. When segmentation is enabled at index time, the search peer 364 performs the keyword search 372 on the bucket's index file 346. As noted previously, the index file 346 includes a lexicon of the searchable terms in the events stored in the bucket's raw data 348 file. The keyword search 372 searches the lexicon for searchable terms that correspond to one or more of the search terms in the query 366. As also noted above, the lexicon includes, for each searchable term, a reference to each location in the raw data 348 file where the searchable term can be found. Thus, when the keyword search identifies a searchable term in the index file 346 that matches a search term in the query 366, the search peer 364 can use the location references to extract from the raw data 348 file the event data 374 for each event that include the searchable term.

In cases where segmentation was disabled at index time, the search peer 364 performs the keyword search 372 directly on the raw data 348 file. To search the raw data 348, the search peer 364 may identify searchable segments in events in a similar manner as when the data was indexed. Thus, depending on how the search peer 364 is configured, the search peer 364 may look at event fields and/or parts of event fields to determine whether an event matches the query 366. Any matching events can be added to the event data 374 read from the raw data 348 file. The search peer 364 can further be configured to enable segmentation at search time, so that searching of the index 338 causes the search peer 364 to build a lexicon in the index file 346.

The event data 374 obtained from the raw data 348 file includes the full text of each event found by the keyword search 372. During a third phase of the map process 370, the search peer 364 performs event processing 376 on the event data 374, with the steps performed being determined by the configuration of the search peer 364 and/or commands in the search query 366. For example, the search peer 364 can be configured to perform field discovery and field extraction. Field discovery is a process by which the search peer 364 identifies and extracts key-value pairs from the events in the event data 374. The search peer 364 can, for example, be configured to automatically extract the first 100 fields (or another number of fields) in the event data 374 that can be identified as key-value pairs. As another example, the search peer 364 can extract any fields explicitly mentioned in the search query 366. The search peer 364 can, alternatively or additionally, be configured with particular field extractions to perform.

Other examples of steps that can be performed during event processing 376 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 364 sends processed events 378 to the search head 362, which performs a reduce process 380. The reduce process 380 potentially receives events from multiple search peers and performs various results processing 382 steps on the received events. The results processing 382 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 382 can further include applying commands from the search query 366 to the events. The query 366 can include, for example, commands for evaluating and/or manipulating fields (e.g., to generate new fields from existing fields or parse fields that have more than one value). As another example, the query 366 can include commands for calculating statistics over the events, such as counts of the occurrences of fields, or sums, averages, ranges, and so on, of field values. As another example, the query 366 can include commands for generating statistical values for purposes of generating charts of graphs of the events.

The reduce process 380 outputs the events found by the search query 366, as well as information about the events. The search head 362 transmits the events and the information about the events as search results 368, which are received by the search and reporting app 316. The search and reporting app 316 can generate visual interfaces for viewing the search results 368. The search and reporting app 316 can, for example, output visual interfaces for the network access application 306 running on a computing device 304 to generate.

The visual interfaces can include various visualizations of the search results 368, such as tables, line or area charts, Choropleth maps, or single values. The search and reporting app 316 can organize the visualizations into a dashboard, where the dashboard includes a panel for each visualization. A dashboard can thus include, for example, a panel listing the raw event data for the events in the search results 368, a panel listing fields extracted at index time and/or found through field discovery along with statistics for those fields, and/or a timeline chart indicating how many events occurred at specific points in time (as indicated by the timestamps associated with each event). In various implementations, the search and reporting app 316 can provide one or more default dashboards. Alternatively or additionally, the search and reporting app 316 can include functionality that enables a user to configure custom dashboards.

The search and reporting app 316 can also enable further investigation into the events in the search results 316. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 366. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Performing Maintenance on a Data Intake and Query System with Minimal Performance Impact Ingesting data by a data intake and query system includes processing and storing of data produced by data sources (e.g., data source 102 of FIG. 1) associated with a subscriber entity (or tenant) of the data index and query system, where the data is transmitted to the data intake and query system using one or more forwarders (e.g., forwarder 226 of FIG. 2). Processing of the data can include parsing the data to identify individual events, where an event, as mentioned previously, is a discrete portion of machine data that can be associated with a timestamp. Processing of the data can further include generating an index of the events, where the index is a data storage structure in which the events are stored and the computing device performing the indexing is referred to as an indexer (e.g., indexer 232 of FIG. 2).

Managing the ingestion and processing of large data volumes becomes particularly complex when the data intake and query system 110 is offered as a service in a public cloud, following a Software as a Service (SaaS) model. This scenario introduces a substantial technical challenge of mitigating impact to customer searches and business activities on the data intake and query system 110 during maintenance and upgrade activities. Effectively addressing this challenge entails employing different approaches for managing the maintenance depending on the type of search and the component of the data intake and query system being upgraded. As will be explained further below, for example, the treatment of long running searches can be different from short-running searches. Further, the manner in which indexers are upgraded can be different than the manner in which search heads are upgraded. The goal is to provide uninterrupted data operations and maintain the integrity of the service under varying circumstances.

In conventional information technology platforms, there is a significant loss in search performance during a maintenance window or during an upgrade. Loss in search performance is often unacceptable for certain clients. Accordingly, this is a significant challenge for providers of a data intake and query system.

Implementations of a cloud deployment for a data intake and query system adeptly tackle challenges related to search performance loss during routine maintenance and system upgrades. To alleviate the impact on customer searches, various strategies are employed when executing searches at the commencement of a maintenance window or upgrade. For example, distinct network elements within the data intake and query system are treated differently during an upgrade window to minimize user search performance impact. For instance, the number of search heads can be dynamically scaled to a higher count during a maintenance window, providing increased support for ongoing search activities while specific search heads undergo maintenance. Similarly, for indexers, a graceful shutdown allows sufficient time for the upload of hot buckets or hot bucket slices to a scalable storage module. This tailored approach to different network elements mitigates disruptions during maintenance windows effectively. Furthermore, depending on the network elements involved, different types of searches may also be given varying treatments. For example, short-running searches are granted a grace period at the onset of the upgrade window, allowing them to conclude their respective search on a designated search head before the upgrade commences. Conversely, long-running searches may experience interruptions but are efficiently restarted from the beginning after the maintenance window concludes.

Implementing such a tailored approach to handling searches and network elements during maintenance and upgrades confers a significant technical advantage to the data intake and query system. For example, dynamically scaling the number of search heads during maintenance windows enables uninterrupted search support, thereby increasing the system's flexibility and efficiency. The graceful shutdown mechanism for indexers further enhances data integrity by allowing the seamless upload of hot buckets and hot bucket slices to the scalable storage module. Also by strategically allowing short-running searches to complete and restarting long-running searches, the system ensures minimal disruption to ongoing search activities, optimizing the overall search performance. This approach not only minimizes the impact on user search experience but also enhances the overall resilience and responsiveness of the data intake and query system during crucial maintenance operations.

Figure 4:
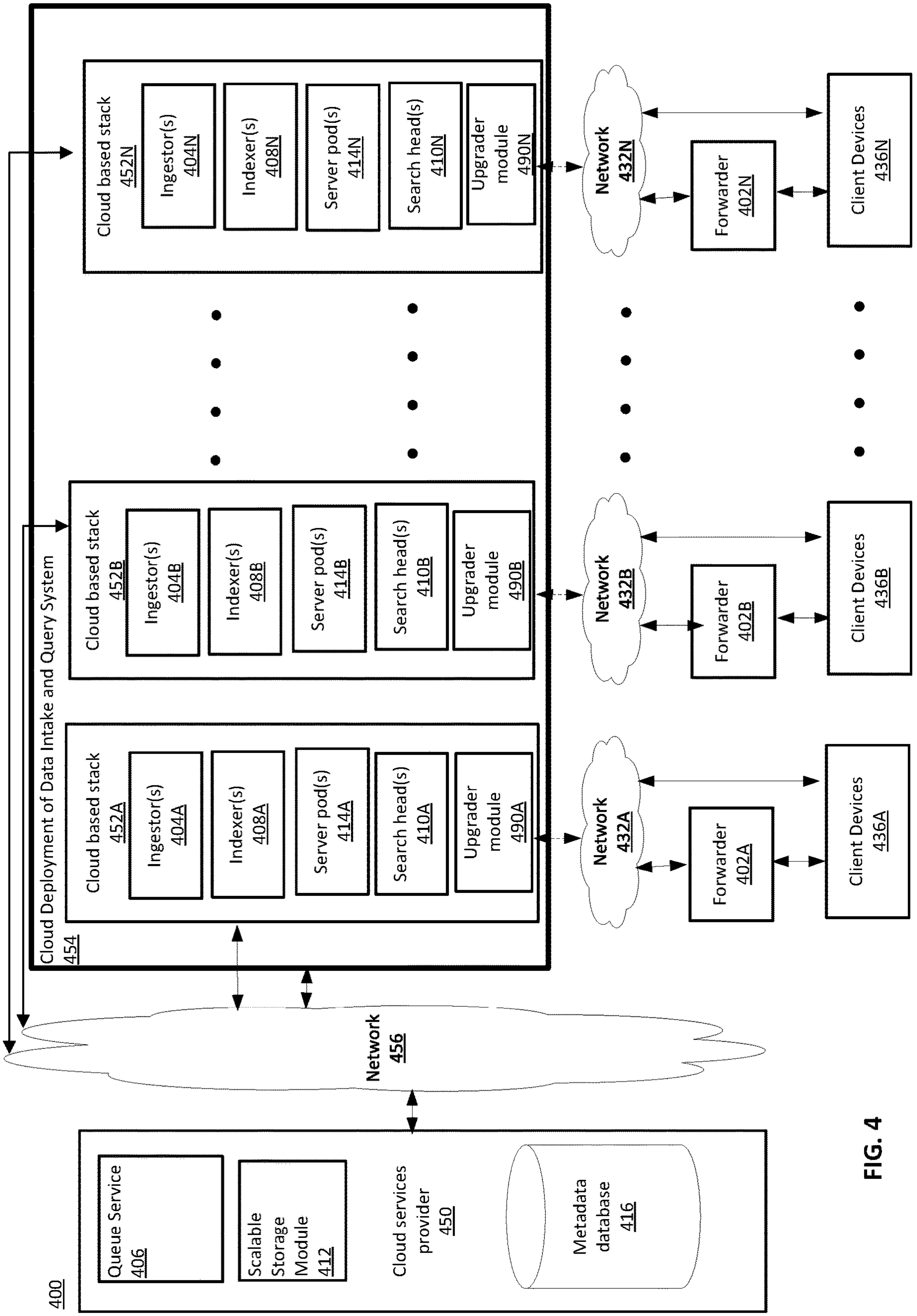
FIG. 4 illustrates a network architecture for a cloud-based data intake and query system, in implementations according to the present disclosure.

FIG. 4 illustrates a network architecture for a cloud-based data intake and query system, in implementations according to the present disclosure. The architecture 400 of FIG. 4 illustrates a cloud deployment of a data intake and query system 454 ("cloud deployment") that is operated by a provider entity operating cloud-based network resources. The cloud deployment 454 may be a distributed implementation of the data intake and query system (e.g., a distributed implementation of the data intake and query system 110).

As discussed previously, "cloud" or "in the cloud" refers to a network model in which an entity operates network resources (e.g., processor capacity, network capacity, storage capacity, etc.), located for example in a data center, and makes those resources available to users and/or other entities over a network. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with the subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation (which includes computing resources physically located on a client or subscriber entity's premises), a subscriber entity does not have physical control of the computing devices that are in the cloud. The subscriber entity has digital access to resources provided by the computing devices only to the extent that such access is enabled by the provider entity.

In the illustration of FIG. 4, the provider entity operates the cloud deployment of the data intake and query system 454 and provides the functionality of the data intake and query system (e.g., the data intake and query system 110) as a service using the cloud, for example under a Software-as-a-Service (SaaS) model, to entities that pay for the user of the service, e.g., on a subscription basis. In this example, the provider entity can provision a separate tenant (or possibly multiple tenants) in the public cloud network for each subscriber entity, where each tenant executes a separate and distinct instance of the data intake and query system 110. These entities can, for example, be subscribers or customers who subscribe to the cloud deployment 454.

As shown in FIG. 4, each tenant can be associated with a respective cloud deployment of a customer stack 452 (referred to herein as a "cloud-based stack") (e.g., 452A, 452B . . . 452N). For explanatory purposes, multiple instances of like objects are denoted with reference numbers identifying the object and letters identifying the instance, where needed. In some implementations, each cloud-based stack 452 in FIG. 4 executes a separate instance of data intake and query system 110 discussed in connection with FIG. 1. In other words, each cloud-based stack 452 is provisioned in the cloud deployment 454 and is a separate instantiation of a data intake and query system 110 (from FIG. 1) that is associated with a subscriber entity or customer. In some implementations, each subscriber entity may be associated with one or more tenants.

In some implementations, the entity providing the cloud deployment of the data intake and query system 454 is itself subscribing to the cloud services of a cloud service provider 450. As an example, a first entity provides computing resources under a public cloud service model (e.g., cloud service provider 450), a second entity subscribes to the cloud services of the first entity and uses the cloud computing resources to operate the cloud deployment of the data intake and query system 454 (e.g., the provider entity of the cloud-based data intake and query system 454 also referred to herein as the "provider entity"), and a third entity can subscribe to the services of the second provider entity in order to use the functionality of the cloud deployment of the data intake and query system 454 (e.g., a subscriber entity or tenant associated with each cloud-based stack 452A, 452B, . . . 454N). In the illustration of FIG. 4, the data sources from which data is ingested and processed are associated with a tenant (or subscriber entity), users accessing the cloud deployment of the data intake and query system 454 are associated with the tenant, and the analytics and insights provided by the cloud deployment of the data intake and query system 454 are for purposes of the tenant's operations.

A stack comprises a group of computing devices associated with a subscriber entity that implement a separate instance of the data intake and query system 110 and run independently from computing devices associated with other subscriber entities in the platform operated by the provider entity. A stack can either be a cloud-based stack (e.g., cloud-based stack 452), or an on-prem stack (not shown in FIG. 4). The disclosed techniques, however, are particularly effective in relation to cloud-based implementations of the data intake and query system where replicating data across regions is critical for avoiding data loss in case of disasters.

Each cloud-based stack 452 (e.g., cloud-based stacks 452A, . . . 452N) can include, without limitation, a respective ingestor 404 (e.g., ingestors 404A, 404B, . . . 404N), a respective indexer 408 (e.g., indexer 408A, 408B, . . . 408N), a respective server pod 414 (e.g., server pod 414A, 414B, . . . 414N), a respective upgrade module 490 (e.g., upgrader module 490A, 490B, . . . 490N), and a respective search head 410 (e.g., search head 410A, 410B, . . . 410N). The cloud services provider 450 can include, without limitation, a queue service 406, a scalable storage module 412, and a metadata database 416.

As noted above, in some implementations, the provider entity making the cloud deployment of the data intake and query system 454 available is itself subscribing to the cloud services of a cloud service provider 450. Accordingly, the provider entity that controls the cloud deployment 454 operates network resources (e.g., processor capacity, network capacity, storage capacity, etc.) that are leased from the cloud services provider 450 and located, for example, in a data center controlled by the cloud services provider 450. The provider entity makes these network resources available to subscriber entities. For example, the provider entity controls the computing devices included within each cloud-based stack (e.g., ingestors 404, indexers 408, server pods 414, search heads 410 and other components associated with the data intake and query system 110 discussed in connection with FIGS. 1-3) and can, for example, allow a subscriber entity to pay for a subscription that enables users associated with subscriber entity to access a certain amount of the provider entity's cloud resources, including the computing devices within the cloud-based stack for a limited time. The subscriber entity does not have physical control of the computing devices that are in the cloud, and has digital access to resources provided by the computing devices only to the extent that such access is enabled by the provider entity.

In some implementations, where the provider entity of the cloud deployment of the data intake and query system 454 subscribes to the cloud services of a cloud service provider 450, the provider entity can communicate with the cloud services provider 450 through a network 456. As noted above, the entire cloud deployment 454 may be provisioned utilizing cloud computing resources offered by or leased from the cloud services provider 450. Furthermore, the provider entity has the capability to request the cloud services provider 450 to increase (or decrease) the allocation of cloud computing resources for the overall cloud deployment 454 or for individual stacks 452. For example, if the provider entity determines that a particular cloud-based stack 452 has requested an upgraded subscription or that the workloads associated with the particular cloud stack 452 has increased, the provider entity may communicate with the cloud service provider 450 and request an increase in allocation of computing resources for the particular stack. Alternatively, in some implementations, each stack 452 may be capable of negotiating or requesting an increase in compute resources directly from the cloud services provider 450. For example, if data ingesting and pre-processing requirements associated with a stack 452 increase, the stack 452 can directly communicate with the cloud services provider 450 through the network 456 and request an increase in computational resources. In response, the cloud services provider 450 may increase an allocation in the number of nodes (e.g., indexers, search heads, etc.) made available to the stack 452.

In some implementations, the queue service 406, the scalable storage module 412 and the metadata database 416 are associated with services provided by the cloud services provider 450. In some implementations, the ingestors 404, indexers 408, server pods 414, and search heads 410 are controlled and operated by the provider entity that subscribes to the cloud services of the cloud services provider 450 and uses the cloud computing resources to operate the cloud deployment of the data intake and query system 454. In some implementations, the indexers 408, search heads 410, the server pods 414, the ingestors 404 and other computing devices needed for each stack can be implemented using program code that can be executed on the computing devices within the stack, as explained previously in connection with FIGS. 1, 2 and 3. In some implementations, the ingestors 404, indexers 408, server pods 414 and search heads 410 can comprise computing instances that allow users to run applications and host various workloads on scalable and resizable virtual servers in the cloud. Additionally, the ingestors 404, indexers 408, server pods 414, and search heads 410 can comprise computing instances executing on physical servers in data centers controlled and operated by the cloud services provider 450. The provider entity can choose from a variety of instance types optimized for different use cases, such as compute-optimized, memory-optimized, storage-optimized, and more.

In some implementations, the upgrader module 490 can be controlled and operated by the provider entity that subscribes to the cloud services of the cloud services provider 450 and uses the cloud computing resources to operate the cloud deployment of the data intake and query system 454. The upgrader module 490 can, in some implementations, be a software module configured to control the manner in which upgrades and maintenance operations take place on the ingestors 404, the indexers 408, and the search heads 410. In some implementations, the upgrader module 490 may operate in conjunction with the server pods 414 to control the manner in which certain upgrades take place (e.g., to perform upgrades on the indexers 408). In some implementations, the upgrader module 490 can be integrated with and implemented on the server pods 414.

In some implementations, the indexers 408 perform substantially the same functions as the indexer 232 discussed in connection with FIG. 2. In some implementations, the search heads 410 perform substantially the same functions as the indexer 362 discussed in connection with FIG. 3. In some implementations, the server pods 414 can coordinate the activities of the indexers 408. As will be further explained in connection with FIG. 5, these server pods 414 are capable of monitoring the activation and inclusion of one or more indexers 408 into a stack. Similarly, they can detect instances when one or more indexers 408 become inactive or are deactivated. In some implementations, the ingestors 404 can perform processing on the event data received from client devices 436 (e.g., client devices 436A, 436B, . . . 436C). For example, the ingestors 404 can parse the events, merge a set of events, and transform the set of events into file blocks that can be uploaded to the scalable storage module 412. When a file block is uploaded to the scalable storage module 412, the ingestors 404 will also transmit the location of the file block (e.g., using a pointer) to be stored on the queue service 406, as will be discussed further in connection with FIG. 5.

In some implementations, the queue service 406 is provided by the cloud services provider to allow different components of a distributed system to communicate by sending and receiving messages. For example, among other things, the queue service 406 can be used to store a pointer to an ingested file block in the scalable storage module 412. Any other components in the system needing access to the file block can retrieve the pointer from the queue service 406. In some implementations, the scalable storage module 412 is a storage service provided by the cloud services provider 450 designed to store and retrieve large amounts of data in a highly scalable and durable manner. In some implementations, objects (e.g., ingested file blocks) are stored in the scalable storage module 412 in containers and each object has a unique key within a container. In some implementations, the metadata database 416 comprises a relational database engine designed to deliver high performance, scalability, and availability. The metadata database 416 is used by the server pods 414 to store metadata corresponding to the indexers 408, as will be further explained in connection with FIG. 5.

In some implementations, each client device 436 (e.g., client devices 436A, 436B, . . . 436N) can communicate with a respective stack 452 (e.g., 452A, 452B, . . . 452N) over a respective network 432 (e.g., 432A, 432B, . . . 432N) through a user interface system. Secure communications between a client device 436 (and other data sources associated with a subscriber entity) and a cloud-based stack 452 are enabled via the network 432 in accordance with example implementations. In various implementations, the network 432A . . . 432N may be portions of the same network or may include one or more shared network components that communicate with each of the networks 432A . . . 432N. In various implementations, the cloud deployment 454 can communicate with a network interface 432 of a given client device 436 through use of a mobile gateway that facilitates communication between devices behind a firewall, or set of firewalls.

In some implementations, the user interface system in each client device 436 may perform substantially the same functions as the user interface system 114 of the data intake and query system 110 discussed in connection with FIG. 1. In some implementations, in addition to the client devices 436 interfacing with a respective stack 452 directly, data produced by data sources associated with each tenant (not shown in FIG. 4) can also be processed by one or more forwarders 402 (e.g., forwarders 402A, 402B, . . . 402N) and communicated through the respective network 432 to a respective stack 452. As indicated in the discussion associated with FIG. 2, a forwarder is a software process that ingests and forwards data from a data source to one or more of the ingestors 404. The forwarder 402 can be implemented using program code that can be executed on the computer device that provides the data source. A forwarder 402 can be configured, among other things, to specify a receiver for the data being forwarded (e.g., one or more ingestors, one or more indexers, another forwarder, and/or another recipient system), to enable or disable data forwarding, and to specify a file, directory, network events, operating system data, or other data to forward, among other operations. The forwarder 402 can provide various capabilities. For example, the forwarder 402 can send the data unprocessed or can perform minimal processing on the data before sending the data to an ingestor 404. Minimal processing can include, for example, adding metadata tags to the data to identify a source, source type, and/or host, among other information, dividing the data into blocks, and/or applying a timestamp to the data. In some implementations, the forwarder 402 can break the data into individual events and send the events to a receiver, such as the ingestor 404. Other operations that the forwarder 402 may be configured to perform include buffering data, compressing data, and using secure protocols for sending the data, for example.

As noted previously, a data source (e.g., data source 102) is a component of a computing device that produces machine data. Machine data is electronically generated data that is output by the component of the computing device and reflects activity of the component. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Accordingly, in some implementations, client device 416 may in itself be a data source that produces data ingested by a respective stack 406.

Using the client device 436, a user can perform various operations with respect to the corresponding cloud-based stack 452, such as administration of the data intake and query system instance comprised within the cloud-based stack 452, management and generation of "knowledge objects," (user-defined entities for enriching data, such as saved searches, event types, tags, field extractions, lookups, reports, alerts, data models, workflow actions, and fields), initiating of searches, and generation of reports, among other operations. In some implementations, the client device 436 can be executing a network access application, such as a web browser or a terminal, through which a user can access a monitoring console provided by the user interface system. The monitoring console performs substantially the same functions as monitoring console 216 discussed in connection with FIG. 2.

In some implementations, using the network access application (e.g., network access application 206 of FIG. 2) installed on the client device 436, a subscriber entity or client can input a query into a search field in a graphical user interface (GUI) of the user interface system (e.g., user interface system 314 in FIG. 3). This GUI can be made available through an application installed on the client device 436 (e.g., search and reporting app 316 also discussed in connection with FIG. 3). Alternatively, or additionally, the search and reporting app can include pre-configured queries or stored queries that can be activated by the user. In some cases, the search and reporting app initiates the query when the user enters the query. In these cases, the query may be referred to as an "ad-hoc" query. In some cases, the search and reporting app initiates the query based on a schedule. For example, the search and reporting app 316 can be configured to execute the query once per hour, once per day, at a specific time, on a specific date, or at some other time that can be specified by a date, time, and/or frequency. These types of queries may be referred to as "scheduled queries."

Data Ingestion and Indexing in a Data Intake and Query System Deployment

Figure 5:
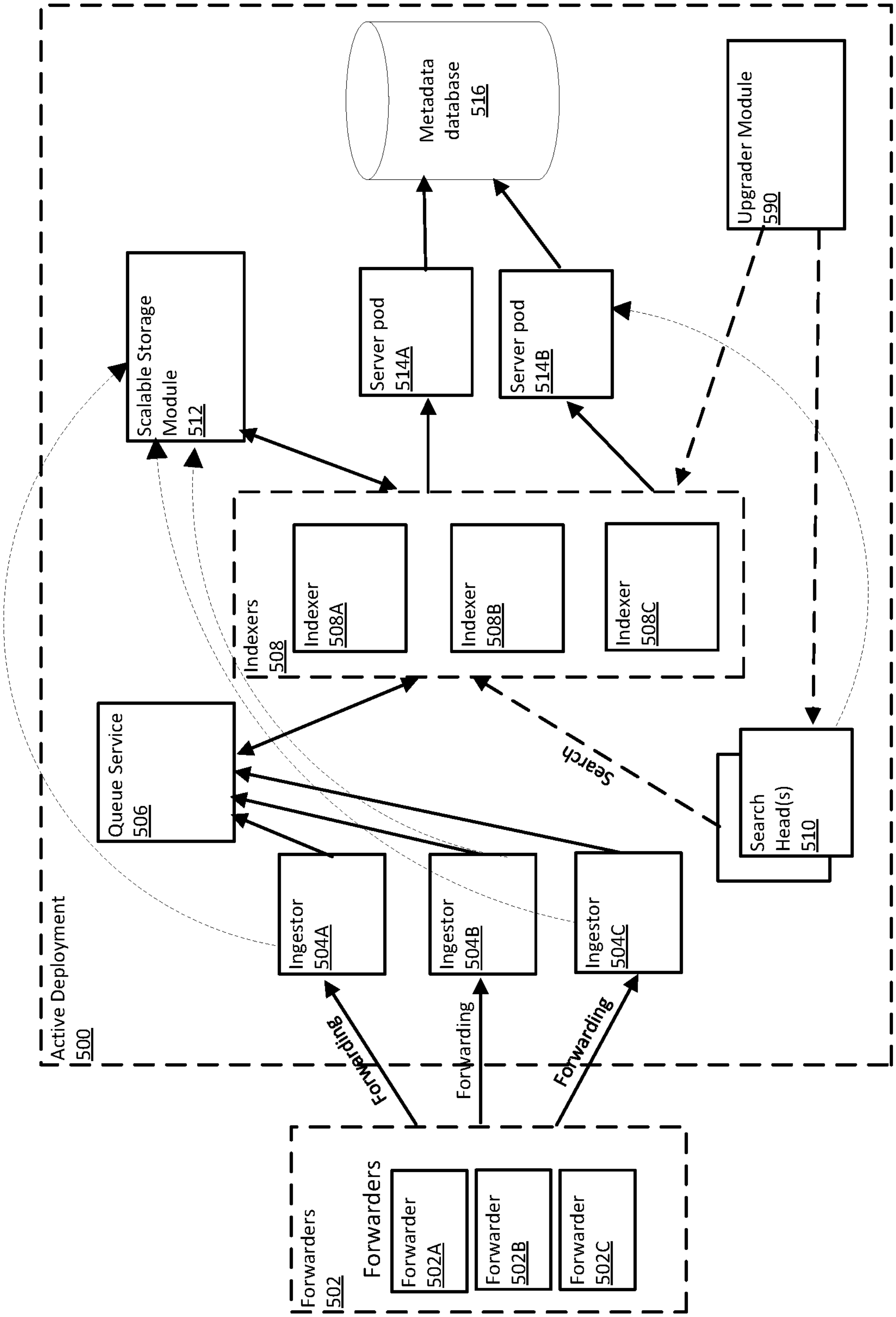
FIG. 5 illustrates a cloud-based network architecture that enables searching and indexing of event data in an active deployment, in implementations according to the present disclosure.

FIG. 5 illustrates a cloud-based network architecture that enables searching and indexing of event data in an active deployment, in implementations according to the present disclosure. In some implementations, forwarders 502 (e.g., including forwarders 502A, 502B, . . . 502N), typically located on a subscribing entity's premises and included in the subscriber entity's "on the premises" implementation (or "on-prem" implementation), forward data from a data source (e.g., data source 102 in FIG. 1) to the active deployment 500.

In some implementations, the active deployment 500 comprises a cloud-based deployment of a data intake and query system and includes, without limitation, one or more ingestors 504 (e.g., ingestors 504A, 504B . . . 504N), a queue service 506, an upgrader module 590, a scalable storage module 512, one or more indexers 508 (e.g., indexers 508A, 508B . . . 508N), one or more server pods 514 (e.g., server pods 514A, 514B, etc.), one or more search heads 510 and a metadata database 514. As discussed in connection with FIG. 4, not all the components of the active deployment 500 are controlled by the same entity. For example, the ingestors 504, the indexers 508, the server pods 514 and the search heads 510 can be controlled by the provider entity and executed on physical servers leased from a cloud services provider (e.g., cloud services provider 450 in FIG. 4). Meanwhile, the queue service 506, the scalable storage module 512 and the metadata database 514 can be controlled by the cloud services provider. Note that the one or more ingestors 504 (e.g., ingestors 504A, 504B . . . 504N), the queue service 506, the scalable storage module 512, the one or more indexers 508 (e.g., indexers 508A, 508B . . . 508N), the one or more server pods 514 (e.g., server pods 514A, 514B, etc.), the upgrader module 590, the one or more search heads 510 and the metadata database 514 perform substantially the same functions as corresponding components illustrated and discussed above in connection with FIG. 4. In some implementations, the active deployment 500 corresponds to a single cloud-based stack 452 illustrated in FIG. 4. However, the active deployment 500 is not limited to a single stack 452 and can also represent cloud deployments of data intake and query systems corresponding to multiple stacks 452.

In some implementations, data from the forwarders 502 is transmitted to the ingestors 504 within the active deployment 500. The ingestors 504 process the incoming data by parsing, merging, and transforming events into distinct file blocks, subsequently uploading these file blocks into the scalable storage module 512. Concurrently, the ingestors 504 initiate the insertion of corresponding metadata messages into the queue service 506 for each file block. These metadata messages include essential information specifying the location of the respective file block within the scalable storage module 512. For example, if the forwarders 502 forward two hundred events to the ingestors 504, the ingestors 504 can ingest the two hundred events and create two exemplary file blocks, file block A and file block B, each with a hundred events. Each file block is uploaded to the scalable storage module 512 (e.g., to an ingested files directory) and a metadata message containing a location reference or pointer is added to the queue service 506 for each of the two file blocks, file block A and file block B.

In some implementations, each instance of creating and uploading a file block to the scalable storage module 512, along with the insertion of a corresponding message into the queue service 506, prompts the responsible ingestor 504 to transmit an acknowledgment message to one or more of the forwarders 502. Upon receipt of this acknowledgment message from the ingestor 504, the forwarder 502 concludes the process by removing the events associated with the acknowledged file block from the forwarder's memory. It is worth noting that, for failover purposes, the forwarder 502 retains copies of the events in the forwarder's memory until the acknowledgment is received. Post-acknowledgment, the forwarder 502 can continue to process other events from client devices.

In some implementations, the indexers 508 check (e.g., periodically) the queue service 506 to determine if any messages pertaining to new file blocks have been added to the queue service 506. In some implementations, the indexers 508 can poll the queue service 506 continuously to check for new messages. When an indexer 508 finds a new message, the indexer 508 determines if there is a location pointer in the new message for a file block residing on the scalable storage module 512. If a location pointer to the scalable storage module 512 is found inside a message, the indexer 508 downloads the corresponding file block from the scalable storage module 512 and indexes the events in the file block. An indexed file block is stored as a "hot bucket slice" at the indexer and also uploaded to the scalable storage module 512.

As discussed previously, the indexers 508 (which perform substantially the same function as indexing module 236 discussed in connection with FIG. 2) organize files in an index (e.g., the index 238 referred to in FIG. 2) in directories referred to as buckets. The files in a bucket (e.g., bucket 244 of FIG. 2) can include raw data files, index files, and possibly also other metadata files. A bucket's location in short-term storage (e.g., short-term storage 240 in FIG. 2) or long-term storage (e.g., long-term storage 242 in FIG. 2) can also be indicated by the bucket's status. As an example, a bucket's status can be "hot," "warm," "cold," "frozen," or "thawed." For example, a bucket can be considered "hot" if an indexer 508 is writing data to the bucket and the bucket becomes a warm bucket when the index 508 stops writing data to it. In some implementations, both hot and warm buckets can reside in short-term storage (e.g., short-term storage 240 in FIG. 2). When a warm bucket is moved to long-term storage (e.g., long-term storage 242 in FIG. 2), the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

In some implementations, one or more search heads 510 are communicatively coupled with one or more indexers 508 and send queries the search heads 510 receive (e.g., from a client device or otherwise) to the indexers (or search peers) 508. As discussed in connection with FIG. 3, using a map process, the search peer 508 searches the appropriate index for events identified by the query and sends events so identified back to the search head 508. Using a reduce process, the search head 508 processes the events and produces results to respond to the query. The results can provide useful insights about the data stored in the indexers 508. These insights can aid in the administration of information technology systems, in security analysis of information technology systems, and/or in analysis of the development environment provided by information technology systems.

Continuing the discussion from above, each file block can be indexed by an indexer 508 to create a hot bucket slice that is stored at the indexer 508 and also uploaded to the scalable storage module 512 (e.g., to an indexer file directory). Uploading the hot bucket slice to the scalable storage module 512 prevents a loss of the hot bucket slice in the event that the indexer fails. Subsequent to uploading the hot bucket slices to the scalable storage module 512, the messages corresponding to the file blocks associated with the hot bucket slices can be deleted from the queue service 506 and, further, the ingested file blocks can also be deleted from the scalable storage module 512. Deleting the ingested blocks from the scalable storage module 512 and the corresponding messages from the queue service is acceptable from a failover perspective because the indexed hot bucket slices corresponding to the file blocks have been uploaded to the scalable storage module 512.

Referring to the example with file blocks A and B from above, an indexer 508 can poll the queue service 506 to discover messages associated with file blocks A and B. Using the location pointers for the two file blocks, the indexer 508 can download the file blocks from the scalable storage module 512 and index the events in the file blocks. For each file block, the indexer 508 can create a separate hot bucket slice and store the hot bucket slices in a hot bucket directory at the indexer 508 and also upload the hot bucket slices to a dedicated hot bucket directory or indexer file directory stored at the scalable storage module 512. Once the hot bucket slices are uploaded to the scalable storage module 512, the messages corresponding to the file blocks A and B can be deleted from the queue service 506 and the scalable storage module 512.

Note that because the hot bucket slices corresponding to file blocks A and B have already been uploaded to the scalable storage module 512, the prior stage's data (corresponding to data in the queue service 506 and the ingested file blocks stored by the scalable storage module 512) can be safely deleted without losing the data. Further note that, at each stage, once the current stage has backed up the data to the scalable storage module 512, the prior stage's data can be deleted. For example, as discussed earlier, each instance of creating and uploading a file block to the scalable storage module 512, along with the insertion of a corresponding message into the queue service 506, prompts the responsible ingestor 504 to transmit an acknowledgment message to one or more of the forwarders 502, which then deletes the events associated with the acknowledged file block from the forwarder's memory. Similarly, once hot bucket slices have been uploaded to the scalable storage module 512, the prior stage's data (corresponding to data in the queue service 506 and the ingested file blocks backed up to the scalable storage module 512) can be safely deleted without losing the data.

After a threshold number of hot bucket slices associated with a given bucket directory has been created by one or more indexers 508, a hot bucket is created by the one or more indexers 508. The hot bucket, among other things, comprises a concatenation of the hot bucket slices, commonly known as a "raw data journal." Further, because no new data can be added to the created hot bucket, the hot bucket is rolled over to a warm bucket status. Note that newly indexed data lands in a hot bucket, where it is actively read and written, but, when a predetermined number of hot bucket slices is reached, or when the size of the data in the hot buckets exceeds the specified threshold, the hot bucket is rolled to a warm bucket. Unlike hot buckets, warm bucks are not actively written to. Warm buckets reside on the same tier of storage as hot buckets. Note that the warm bucket comprises the raw data journal (i.e., the concatenated hot bucket slices), and also includes index files (e.g., time-series index files or tsidx files, etc.), search related files, and possibly also other metadata files. A time-series index file associates each unique keyword in the data with location references to events, which are stored in a companion raw data file (e.g., raw data files associated with the hot bucket slices). The search related files can be used to support or expedite searching of the indexed data in the raw data journal. The warm bucket is thereafter uploaded by the one or more indexers 508 to the scalable storage module 512. Note that in some implementations, the warm bucket is uploaded to a dedicated directory for buckets on the scalable storage module 512 that is different from the directory in which the hot bucket slices are uploaded.

As previously highlighted, in the FIG. 5 implementation, data linked to a preceding stage undergoes deletion only after the current stage has completed processing and successfully uploaded the data to the scalable storage module 512. This design ensures the prevention of data loss through the incorporation of failover mechanisms. Referring back to the example above, consider a scenario where an ingestor 504 encounters a failure during or immediately after processing the two hundred events linked to file block A and file block B, but before transmitting an acknowledgment to the forwarders 502. As emphasized earlier, the forwarder 502 adheres to a protocol where the forwarder 502 retains these events in memory until receiving an acknowledgment from the ingestor 504. In the event of an ingestor 504 failure before acknowledgment transmission, the forwarder initiates another attempt to convey the two hundred events to an alternate ingestor 504. In essence, the forwarder 502 is programmed to persistently re-transmit the events until the file blocks associated with the events are successfully uploaded to the scalable storage module 512, metadata messages containing reference pointers to these file blocks are deposited into the queue service 506, and an acknowledgment message is received by the forwarder 502. This failover mechanism, characterized by the forwarder's persistent attempts to transmit events to ingestors 504 until acknowledgment, serves to avert data loss and uphold data integrity.

Referencing the example above again, consider a situation where an acknowledgment message is successfully sent to the forwarder 502 for the events linked to file blocks A and B. Following this, an indexer 508 (e.g., indexer 508A) examines the queue service 506 for new messages, retrieves messages associated with file blocks A and B, and downloads either file block A, file block B, or both from the scalable storage module 512. However, a failure occurs during the indexing process. As mentioned earlier, messages in the queue service 506 are only deleted after hot bucket slices corresponding to the file blocks associated with the messages are uploaded to the scalable storage module 512 by one or more indexers 508. Consequently, if an indexer 508 (e.g., indexer 508A) encounters a failure while indexing data related to file blocks A or B, the messages associated with these file blocks persist in the queue service 506. Subsequently, after a designated amount of time has passed, these messages become visible to a different indexer 508 (e.g., indexer 508B) actively polling the queue service 506 or periodically checking for messages. The new indexer 508 (e.g., indexer 508B) can then proceed to index the events, generate hot bucket slices, and upload them to the scalable storage module 512.

Building upon the earlier example, consider a situation where the newly introduced indexer 508 (e.g., indexer 508B) takes steps to index the events linked to file blocks A and B. The indexer 508 successfully generates hot bucket slices associated with these file blocks and proceeds to upload them to the scalable storage module 512. Further, the indexer 508 (e.g., indexer 508B) takes steps to delete the file blocks A and B from the scalable storage module 512 and also delete messages associated with the file blocks A and B from the queue service 506. However, shortly thereafter, the indexer experiences downtime or failure. In this scenario, the hot bucket slices associated with file blocks A and B remain stored on the scalable storage module 512. However, the indexer 508 (e.g., indexer 508B) responsible for uploading these hot bucket slices to the designated directory on the scalable storage module 512 is currently inactive. As elaborated further below, the server pods 514 identify the inactive status and downtime of the indexer 508 (e.g., indexer 508B) and prompt another indexer (e.g., indexer 508C) to initiate the recovery of the hot bucket slices.

In some implementations, the server pods 514 orchestrate the actions of the various indexers 508 within the architectural framework. The server pods 514, among their various functionalities, have the ability to monitor instances of indexer downtime, trace the reactivation of one or more indexers 508, monitor the hot buckets or hot bucket directories generated by an indexer 508, and provide instructions to indexers for addressing broken or incomplete buckets arising from indexer downtime. For instance, prior to an indexer 508 initiating the indexing of events in a designated file block, the indexer 508 establishes a directory for the hot bucket slices and informs one or more server pods 514 about the directory creation, along with the corresponding bucket identifier. Thus, the server pods 514 contain information about the presence of directories (or buckets) established by any of the indexers 508, where the directories store hot bucket slices, for example. In some implementations, the server pods 514 store metadata pertaining to the indexers 508 and the associated buckets created by the indexers 508 in the metadata database 516.

Building further upon the earlier example then, when an indexer 508 (e.g., indexer 508B) fails after uploading the hot bucket slices associated with file blocks A and B to the scalable storage module 512, the server pods 514 react to the indexer 508 (e.g., indexer 508B) failing by notifying a different indexer 508 (e.g., indexer 508C) to repair the hot bucket associated with the hot bucket slices that were created by the inactive indexer (e.g., indexer 508B) prior to failure. Put differently, when an indexer (e.g., indexer 508B) experiences a failure, the server pods 514 detects that the indexer has failed. Due to the information stored at the server pods 514 about the buckets created by the failed indexer (e.g., indexer 508B), the server pods 514 can instruct another indexer (e.g., indexer 508C) to rectify the orphaned bucket resulting from the inactivity of the failed indexer (e.g., indexer 508B). Because the server pods 514 track the directory or location of the hot bucket slices generated by each of the indexers 508, the server pods 514 can inform the active indexer 508 (e.g., indexer 508C) of the location of the incomplete bucket (or directory) that needs to be repaired. As noted above, in some implementations, the directories into which the hot bucket slices are uploaded by the indexers 508 are tracked by the server pods 514 based on bucket identifiers.

In some implementations, the active indexer 508 (e.g., indexer 508C) can, thereafter, repair the bucket left incomplete because of the failure of the inactive indexer (e.g., indexer 508B). Repairing the bucket can comprise concatenating the hot bucket slices already uploaded into a raw data journal, and using the raw data journal to generate the other files needed to build the bucket including the time-series index file, metadata files, and other search related files. The repaired hot bucket is subsequently rolled over to a warm bucket status and uploaded to the scalable storage module 512 by the active indexer (e.g., indexer 508C). After uploading the warm bucket to the scalable storage module 512, the active indexer (e.g., indexer 508C) can delete the hot bucket slices previously uploaded to the scalable storage module 512 by the inactive indexer (e.g., indexer 508B) and can further notify the server pods 514 that the hot bucket left incomplete due to the failure of the inactive indexer (e.g., indexer 508B) has been repaired and restored.

The above example highlights the failover mechanisms embedded at each stage within the architecture discussed in relation to FIG. 5. These mechanisms are designed to ensure the recovery and restoration of data in the event of a failure at any stage. Indeed, data within the architecture depicted in FIG. 5 can be recovered even in a scenario where all ingestors 504 and indexers 508 (e.g., indexers 508A, 508B, 508C) are inadvertently wiped clean during an outage. Imagine a hypothetical situation where, following the creation and upload of ten warm buckets of event data to the scalable storage module 512, both ingestors 504 and indexers 508 undergo a complete wipeout during an outage. In such a case, the server pods 514 and the metadata database 516 retain information concerning the inactive indexers 508 and the buckets they previously generated. Consequently, if new indexers 508 (e.g., indexers 508D, 508E, 508F, not shown in FIG. 5) are activated, the server pods 514 can guide these new indexers to identify the buckets uploaded to the scalable storage module 512 by the now inactive indexers. The new indexers (e.g., indexers 508D, 508E, 508F, not shown in FIG. 5) can, in some implementations, download the buckets and effectively replace the inactive indexers 508. Accordingly, when a new search query is transmitted to the new indexers 508 from a search head 510, the new indexers can use the data in the buckets to facilitate a response to the search query.

Expanding upon the previous example, envision a situation where, in addition to the inadvertent wipeout of ingestors 504 and indexers 508 (e.g., indexers 508A, 508B, 508C), the metadata database 516 is also unintentionally cleared. In this scenario, aside from the ten warm buckets on the scalable storage module 512, no other information regarding the presence of indexed data exists within the architecture of FIG. 5. In certain implementations addressing this circumstance, new indexers (e.g., indexers 508D, 508E, 508F, not shown in FIG. 5) and a new metadata database 516 are activated and brought online. The server pods 514 are programmed to inspect the scalable storage module in the dedicated directory for warm buckets, checking for warm buckets that require bootstrapping or rediscovery. These server pods 514 can identify the ten warm buckets on the scalable storage module 512 in the specified directory, extract associated metadata, and populate the extracted information into the newly activated metadata database 516. Once the metadata for the warm buckets has been bootstrapped and populated in the new metadata database 516, the aforementioned procedure can be employed to initiate the new indexers (e.g., indexers 508D, 508E, 508F, not shown in FIG. 5) to make the warm buckets searchable. The example above illustrates that as long as event data is successfully uploaded to the scalable storage module 512, the data can be recovered even if there is a failure or wipeout of one or most of the other network elements (besides the scalable storage module 512) illustrated in FIG. 5.

Performing Maintenance or Upgrades to Components of a Stack with Minimal Disruption Maintenance activities are often bundled together and performed at the same time in generalized systems, causing issues for subscribers of a data intake and query system (e.g., subscribers associated with stacks 452 of FIG. 4). This can result in adverse effects on indexing and search times, and in more severe cases, it may lead to unstable environments. Additionally, generalized systems lack predictability and flexibility in determining the timing of maintenance activities. There is often a significant amount of manual intervention required to ensure the success of upgrades or updated software releases. Accordingly, as noted previously, implementations of a cloud deployment for a data intake and query system are specifically crafted to adeptly tackle challenges related to search performance loss during routine maintenance and system upgrades. To alleviate the impact on customer searches, various strategies are employed (e.g., at the commencement of a maintenance window or upgrade) when executing searches.

Addressing the challenge of minimizing the impact of maintenance windows on searches is complicated by the stateful nature of searches, which lack a time constraint for their duration. Scheduled searches, in particular, may potentially run indefinitely until manually halted, while others are comparatively shorter in duration. Consequently, different treatment may be necessary for various types of searches when facing an impending maintenance window.

Moreover, within the data intake and query system (e.g., the active deployment 500), there exist diverse components. The components with the most direct influence on search performance are typically the indexers (e.g., indexers 508) and the search head (e.g., search heads 510). It is important to note that a subscribing tenant might have either a single search head 510 as part of the deployment, or, for larger-sized clients or tenants, a cluster comprising multiple search heads 510 can be deployed. As noted previously, in some implementations, the upgrader module 590 in an active deployment 500 can control the maintenance of the various stack components including the indexers 508 and the search heads 510.

A) Upgrading Search Head Clusters

In some implementations, where a client has a search head cluster comprising multiple search heads 510 deployed, the maintenance on the various search heads in the cluster can be staggered by the upgrader module so that not all of the search heads are upgraded at the same time. This approach helps to minimize potential disruptions by ensuring that not all search heads are undergoing maintenance simultaneously. In some implementations, if the search heads in a cluster need to be restarted to perform the upgrade, a similar technique is employed, where the shut-down and restart times for each search head in the cluster is staggered and is scheduled to occur at different times.

Upgrading a search head cluster presents the challenge of potential disruptions to both short and long-running searches during the upgrade process. To mitigate this challenge, some implementations differentiate between short-running and long-running searches. For instance, a graceful shutdown timer is employed by the upgrader module 590 in some implementations, allowing a brief period for short-running searches to conclude on one or more of the search heads 510 in the cluster before initiating the upgrade. This timer's duration is programmable and can be tailored for each stack 452. As an example, a search head cluster might allocate a three-minute graceful shutdown timer, permitting short-running searches on a particular search head to complete before the maintenance on that search head commences when a maintenance window begins.

In some implementations of the data intake and query system, a progressive upgrade strategy, referred to as a rolling upgrade, is performed by the upgrader module 590 to facilitate the phased upgrade of cluster members with minimal disruption to ongoing searches. This approach ensures a smooth transition to an upgraded version of the data intake and query system (or upgraded version of search head specific software), distinguishing itself from conventional upgrade methods by offering heightened flexibility and operational continuity.

In some implementations, initiating a rolling upgrade comprises selecting a specific cluster member, which is then placed into "manual detention." During this phase, the search head 510 or cluster member is temporarily isolated from accepting new search jobs. In some implementations, the search head 510 slated for the upgrade deregisters from the cluster. Deregistration serves to halt the redirection of additional searches to the search head undergoing maintenance, such that no further searches are directed to that search head. Instead, new incoming searches are redirected to other operational members of the search head cluster, thus maintaining continuous search functionality during the upgrade process.

Simultaneously, ongoing short-running searches (e.g., three minutes or under) on the search head 510 are allowed to conclude within a configurable timeout period, providing the searches with the opportunity to complete gracefully before the software upgrade. Following the completion of ongoing searches, the software upgrade is executed on the detained member, and, thereafter, the search head 510 is subsequently brought back online. This sequential process is repeated for each cluster member of the search head cluster (which includes search head 510) until the comprehensive rolling upgrade is successfully completed.

In some implementations, the rolling upgrade methodology encompasses several integral features to ensure a seamless transition. Firstly, the upgrade occurs in a sequential manner, addressing cluster members individually to prevent simultaneous disruptions. Secondly, during manual detention, a cluster member refrains from accepting new searches, executing ad hoc searches, or receiving new search artifacts from other members. Despite this isolation, the member continues to actively participate in crucial cluster operations, including captain election and automatic configuration replication. Additionally, during the manual detention period, new scheduled searches are automatically redirected to other operational members. The detained cluster member awaits the conclusion of in-progress searches, up to a user-defined maximum time, striking a balance between search completion and timely upgrade execution. Lastly, the rolling upgrade methodology seamlessly applies to various different types of searches within the data intake and query system, accommodating diverse user needs and system functionalities.

In some implementations, for searches exceeding the programmable duration (e.g., three minutes, as previously discussed), the search head 510 overseeing the search interrupts the process, leading to either a temporary halt or failure of the search. Following the maintenance, when the search head 510 is back online, the interrupted search is automatically reinitiated. For example, real-time searches and long-running searches are interrupted and restarted at the search head 510. Note that a real-time search is one that displays a live and continuous view of events as the events stream into the data intake and query platform. With real-time searches and reports, a user can search events before the events are indexed and preview reports as the events stream in. In some implementations, long-running searches and real-time searches are treated similarly in that the long-running searches and real-times searches are simply restarted after the search head being upgraded comes back online. In some implementations, the long-running searches can be started on a search head in the cluster that is still actively operational while the search head on which the long-running search was initially executing is upgraded.

In certain implementations, particularly those involving software upgrades rather than hardware upgrades, a departure from the conventional approach of canceling and restarting a long-running search can be introduced. Instead, a strategy is employed where the lifespan of certain types of searches is extended. This extension allows the search to persist in the background seamlessly while the software upgrade is in progress. Alternatively, the search can be temporarily paused (instead of aborting the search) during the software upgrade, ensuring a smoother and more uninterrupted transition.

It is important to note that the strategies outlined earlier for mitigating search disruptions within a search head cluster are equally applicable, regardless of whether the cluster is situated at a client's premises or forms part of a cloud deployment. In essence, the utilization of the graceful shutdown timer, the implementation of rolling upgrades, and the different strategies for handling of long and short-running searches is not confined solely to cloud deployments; rather, these techniques are equally effective and can be seamlessly employed in on-premises solutions as well.

B) Upgrading Standalone Search Heads

In scenarios where a client operates a standalone search head 510 not integrated into a cluster, some implementations dictate a distinct approach to maintenance compared to a clustered environment, aimed at minimizing disruptions. The process of upgrading a single search head presents greater challenges compared to upgrading a search head within a cluster, primarily due to the absence of backup search heads to seamlessly take over in case of disruptions. In some implementations, each search head 510 is configured with a functionality enabling the search head 510 to operate in a "cluster mode," wherein prior to the upgrade the search head 510 operates as a cluster of one. Before an upgrade comes along, however, the number of search heads in the active deployment 500 is automatically scaled out. The provider entity of the data intake and query system can request additional computing instances from the cloud services provider 450.

In some implementations, the provider of the data intake and query system (e.g., the provider entity controlling each of the stacks 452) transmits a request to the cloud services provider 450 through the network 456 requesting to provide additional computing instances to add additional search heads to the cluster of one. As discussed above, the provider entity that controls the cloud deployment 454 operates network resources (e.g., processor capacity, network capacity, storage capacity, etc.) that are leased from the cloud services provider 450 and located, for example, in a data center controlled by the cloud services provider 450. The provider entity makes these network resources available to subscriber entities. In some implementations, where the provider entity of the cloud deployment of the data intake and query system 454 subscribes to the cloud services of a cloud service provider 450, the provider entity can communicate with the cloud services provider 450 through a network 456. As noted above, the entire cloud deployment 454 may be provisioned utilizing cloud computing resources offered by or leased from the cloud services provider 450. Furthermore, the provider entity has the capability to request the cloud services provider 450 to increase (or decrease) the allocation of cloud computing resources for the overall cloud deployment 454 or for individual stacks 452. For example, if the provider entity determines that a search head 510 is to be serviced and needs to increase the cluster size for that single search head 510 from one to, for example, three or more, the provider entity may communicate with the cloud service provider 450 and request an increase in allocation of computing resources and, in particular, search heads for the particular stack.

Alternatively, in some implementations, each stack 452 may be capable of negotiating or requesting an increase in compute resources directly from the cloud services provider 450. For example, if the single search head 510 needs to be upgraded to a cluster of multiple search heads, the stack 452 can directly communicate with the cloud services provider 450 through the network 456 and request an increase in computational resources. In response, the cloud services provider 450 may increase an allocation in the number of nodes (e.g., search heads 510, etc.) made available to the stack 452.

In some implementations, once the single search head 510 undergoes an upgrade to a cluster, the maintenance follows a rolling upgrade process, similar to the method described earlier for clustered search heads. In other words, each of the search heads is upgraded in a sequential manner, instead of simultaneously, so that there are always search heads available in the cluster to perform search operations without disrupting the search pipeline.

In some implementations, following the successful upgrade of the single search head 510, the additional search heads provisioned from the cloud services provider 450 (specifically for the upgrade process) can be decommissioned. Subsequently, the search head 510 can seamlessly return to operating as a standalone cluster (e.g., a cluster of one), ensuring operational continuity with a cluster size of one.

C) Upgrading Indexers

In the case of indexers, the indexers typically need to be restarted during the upgrade process or during a maintenance window. Accordingly, it is important to configure the indexers in a way such that the impact on search and indexing performance is minimized during an upgrade of the indexers.

As a threshold matter, however, it is important to note the impact of indexer upgrades on the ingestion process. As long as not all indexers experience downtime simultaneously, the availability of the ingestion process (e.g., performed by the ingestors 504) is minimal. In the event of a single indexer going offline, ingestion operations (e.g., including ingesting event data from the forwarders 502 and the indexing of the ingested data by the indexers 508) seamlessly transition to other operational indexers, ensuring continual data intake. Further, because the indexers 508 are decoupled from the ingestors 504 using the queue service 506, the impact of one or more indexers being temporarily deactivated for upgrading purposes on the ingestion process is minimal.

In some implementations, akin to the upgrade process for search heads in a search head cluster, a graceful shutdown process is applied to indexers during upgrades. For instance, short running searches, those completing within a predetermined time frame (e.g., searches that can run to completion under three minutes), are allowed to finish. Meanwhile, extended searches may be terminated and, if necessary, retried from a search head. In practical terms, this entails the search head 510 engaging in a retry process and re-transmitting the search to the indexers 508. Additionally, in some implementations, the search head 510 may redirect the search to another indexer 508 (excluding the one undergoing the upgrade) for execution.

In certain implementations, the indexers undergo a progressive upgrade strategy known as a rolling upgrade, diverging from simultaneous upgrades. This methodology ensures that not all indexers undergo upgrades concurrently. Consequently, the burden of an indexer undergoing an upgrade is distributed among other indexers that remain operational, allowing for a more gradual and distributed upgrade process.

As noted above, in some implementations, each stack 452 of FIG. 4 employs a bucket-based storage system, where each bucket comprises directories housing both data and index files. The organization of buckets is typically based on the chronological order of the data. As discussed above, a bucket's status can be "hot," "warm," "cold," "frozen," or "thawed." In this example, hot bucket is one to which an indexer 408 is writing data and the bucket becomes a warm bucket when the index 508 stops writing data to it. When a warm bucket is moved to long-term storage, the bucket becomes a cold bucket. In various embodiments, warm buckets are uploaded into a remote storage for persistency. As a result, every indexer 408 can obtain a copy of any warm bucket by downloading the copy from remote storage. Therefore, during a rolling upgrade or restart, even if a given indexer 408 is down, other indexers 408 will be able to access any given warm bucket. In various embodiments, hot buckets are rolled into warm buckets during a rolling upgrade or restart so that indexers 408 can access the warm buckets from remote storage. In the event of an ungraceful shutdown where a hot bucket is not rolled into a warm bucket, one or more hot bucket repair operations are used to recover the hot buckets.

In some implementations, initiating a rolling upgrade comprises selecting a specific indexer 508 from an indexer cluster or a group of indexers (e.g., indexers 508A, 508B, . . . 508N), which is then placed into "manual detention." During this phase, the indexer 508 is temporarily isolated from accepting new indexing or search jobs. In some implementations, the indexer 508 slated for the upgrade is deregistered by a server pod 514. Deregistration serves to halt the redirection of additional searches to the indexer 508 undergoing maintenance, ensuring that no further searches are directed to that indexer 508. Instead, new incoming searches are redirected to other indexers of the cluster, thus maintaining continuous search functionality during the upgrade process. This process is repeated for each member of the indexer cluster (e.g., indexer 508A indexer 508B, . . . indexer 508N) until the comprehensive rolling upgrade of all indexers is completed.

In some implementations, before initiating the shutdown of an indexer 508 for maintenance, the server pod 514 transmits a signal to notify the indexer 508 of an impending shutdown or restart for maintenance purposes. Subsequently, the indexer to undergo an upgrade concludes the uploading of any hot bucket slices the indexer 508 is actively indexing to the scalable storage module 512. Additionally, it completes the flushing process for existing hot buckets, ensuring they are seamlessly transitioned to warm buckets. The upload and transition of hot bucket slices to warm buckets holds significance for enabling the accuracy of search results. As these hot bucket slices embody newly indexed data by the indexer 508, it is essential to roll them over to a searchable warm bucket status and upload them to the scalable storage module 512 before initiating the upgrade. This ensures that other indexers within the cluster can access the warm bucket, enabling seamless searching capabilities. Following these preparatory steps, the indexer 508 slated for an upgrade ceases to send synchronization or heartbeat messages to the server pod 514. This cessation signals to the server pod 514 that the indexer is no longer available for further indexing.

In some implementations, there can be bucket slices that an indexer has not finished indexing 508 during the graceful shutdown window (the duration for which is programmable, as mentioned above). The unfinished hot bucket slices will, in some implementations, need to be repaired by other indexers in the cluster that are still running while the deactivated indexer is being upgraded (in order to make the data in those slices become searchable). In such instances, the indexer to be upgraded uploads the hot bucket slices that were not consolidated into a bucket to the scalable storage module 512 prior to shutting down (e.g., during the graceful shutdown period). The other indexers in the cluster can, for example, be instructed by the server pod 514 to repair the hot bucket slices (uploaded to the scalable storage module 512) and roll them over to a warm bucket status. The warm buckets are searchable and the data indexed as part of the hot bucket slices (which is now in the form of a warm bucket) is included in any search results.

In some implementations, the server pod 514 marks the indexer 508 as down and, thereafter, new searches are automatically redirected away from the deactivated indexer. An updated bucket map (which details the buckets an indexer is responsible for searching as will be explained in greater detail below), excludes the inactive indexer 508, ensuring the uninterrupted execution of new searches. It is important to note that a delay can exist between the indexer discontinuing synchronization or heartbeat messages and the server pod 514 officially marking the indexer 508 as down. While this delay is typically constrained to a few seconds, it may extend under intense server loads. Consequently, in some implementations, the indexer 508 scheduled for an upgrade continues to accept new searches until the indexer 508 verifies the exclusion of searches intended for the indexer 508.

In some implementations, after the heartbeat ceases, the indexer enters a waiting period for ongoing searches to conclude within a configurable timeout, which can for example be set to three minutes. Post this timeout, ongoing searches are terminated and can be retried on other indexers in the cluster. For example, in some implementations, a new bucket map is created, which assigns the searches to a different indexer in the cluster. In some implementations, the search can also be retried at a different time after the indexer to be upgraded is operational again.

One of the challenges that arises during a rolling upgrade of indexers 508 in a cluster of indexers is that the ownership of buckets can influence search results when the membership of the indexers in the cluster is fluctuating (e.g., as a result of rolling restarts). In an active deployment (e.g., the active deployment 500), typically each bucket is assigned to one of the indexers in the cluster. The indexer to which a bucket is assigned is considered the "owner" of the bucket and is solely responsible for searching the contents of the bucket. When indexers go down or are being upgraded, the buckets need to be reassigned to other indexers.

In some implementations, bucket assignments are implemented using partitions and bucket maps. Each partition contains a group of buckets and each bucket is assigned to only a single partition. Each of the partitions is assigned to one of the indexers 508 in a cluster (e.g., a cluster comprising indexers 508A, 508B, . . . 508N). Finding the ownership of a bucket, therefore, comprises finding the partition to which a bucket belongs and, subsequently, finding the indexer that owns the partition. In some implementations, to achieve an even distribution of buckets to indexers, buckets are first evenly distributed to partitions and thereafter the partitions can be evenly distributed to indexers. A bucket map comprises a mapping of each of the buckets to an indexer. The bucket map comprises a mapping of a set of buckets to each partition (where each bucket is assigned to only a single partition) and a mapping of each partition to an indexer (where each partition is assigned to only one indexer).

In certain implementations, the initiation of a new bucket map version occurs when a server pod 514, responsible for coordinating indexer activities as previously described, detects alterations in the available indexers-such as the addition or removal of indexers. In generalized data intake and query systems, the creation of a new version of a bucket map prompts the marking of older bucket maps as inactive. Consequently, if an indexer requests an outdated bucket map from the server pod 514, it receives an error message. It is important to note that, in some implementations, the creation of a new bucket map version does not necessarily entail the reassignment of buckets to partitions; typically, only the mapping of partitions to indexers undergoes modification.

It should be noted that the allocation of buckets to partitions is typically exclusive to warm buckets. This allocation occurs during the transition of buckets from the hot to warm state. Unlike hot buckets, which remain unassigned to partitions, implementations of the data intake and query system described herein provide flexibility, allowing any indexer to undertake repairs on a hot bucket if the original indexer is inactive and going through an upgrade. Accordingly, if hot bucket slices remain once an indexer has become inactive for an upgrade, any of the other indexers 508 in the cluster can perform a repair on those hot bucket slices and roll them over to warm status. This avoids constraining repairs to the newly reassigned indexer owning the partition.

In certain implementations, a departure from conventional data intake and query systems is observed when an indexer undergoes an upgrade or maintenance. Short-running searches permitted to execute on the indexer during the graceful shutdown window-such as the three-minute graceful shutdown window—are allowed to proceed even when associated with outdated bucket map versions. Typically, the rolling upgrade of indexers within the cluster is a phased process. Consequently, the server pod 514 periodically generates new bucket maps as indexers undergo upgrades, and the buckets owned by these indexers necessitate reassignment to other active indexers. In order to streamline the upgrade process, some implementations of the data intake and query system relax the standard requirement that searches can only be executed with the most current bucket map versions. This deviation from the norm enhances the adaptability of the system during maintenance or upgrades, allowing short-running searches to proceed smoothly despite being associated with outdated bucket maps, contributing to a more seamless and efficient upgrade experience.

Figure 6:
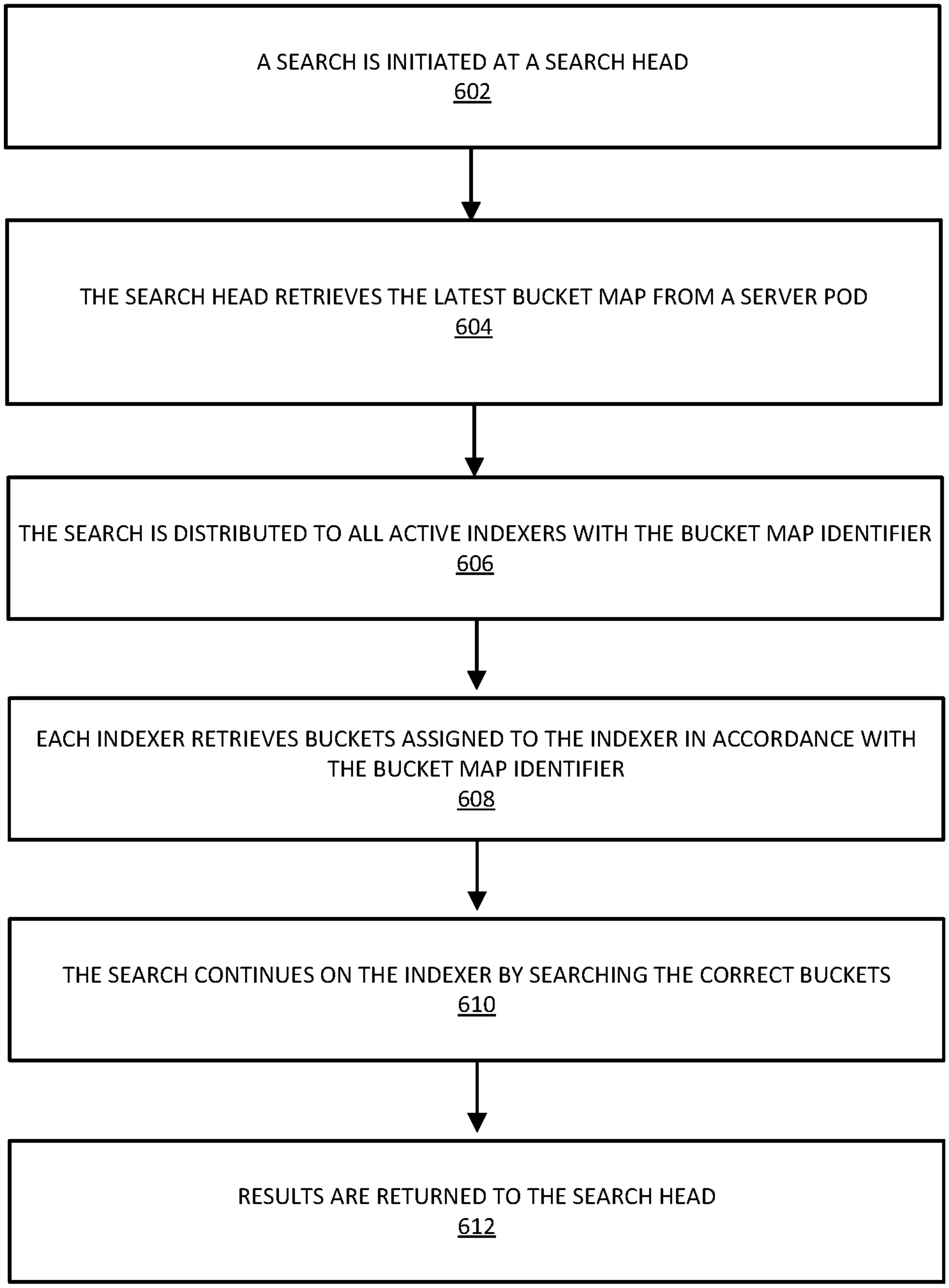
FIG. 6 is a flowchart illustrating an example of a computer-implemented method for performing a search in an active deployment of a data intake and query system, in implementations according to the present disclosure.

FIG. 6 is a flowchart illustrating an example of a computer-implemented method for performing a search in an active deployment of a data intake and query system, in implementations according to the present disclosure. The example process 600 can be implemented, for example, by a computing device that comprises a processor and a non-transitory computer-readable medium. The non-transitory computer readable medium can be storing instructions that, when executed by the processor, can cause the processor to perform the operations of the illustrated process 600. Alternatively, or additionally, the process 600 can be implemented using a non-transitory computer-readable medium storing instructions that, when executed by one or more processors, cause the one or more processors to perform the operations of the process 600 of FIG. 6.

At block 602, a search is initiated at a search head (e.g., a search head 510 shown in FIG. 5). The search can be received, for example, by an entity subscribing to the data intake and query system. The search can, for example, be a scheduled search or a real-time search.

At block 604, the search head 510 retrieves the latest bucket map from a server pod 514. As discussed above, the server pod 514 is responsible for creating bucket maps and creates new bucket map versions whenever indexers 508 are added to or removed from a cluster.

At block 606, the search head 510 distributes the search to all the active indexers 508 along with the bucket map identifier associated with the retried bucket map.

At block 608, each indexer 508, responsible for the buckets relevant to the ongoing search, fetches the buckets assigned to the indexer 508 based on the specific bucket map identifier. It is worth noting that for distinct bucket map identifiers, each indexer can own a unique set of buckets. The responsive buckets are handled by the indexer in two ways: they can either be cached locally if the indexer has encountered the bucket map identifier before, or they can be retrieved from the scalable storage module by making a request to the server pod 514. This dynamic retrieval process ensures that each indexer efficiently accesses and manages the appropriate set of buckets based on the specified bucket map identifier.

At block 610, the search can continue on each of the indexers 508 by searching the correct buckets that are owned by the indexer 508. At block 612, the results are returned to the search head.

As previously discussed, during rolling upgrades, the frequent deactivation and reactivation of indexers leads to the creation of new bucket maps at an unusually high rate. Consequently, when an indexer, at block 608, contacts the server pod 514 to retrieve buckets for a specific bucket map identifier, there is a likelihood that the bucket map version for that identifier is already outdated. In conventional systems, this circumstance would result in a failed search attempt. However, within certain implementations of the data intake and query system, if an indexer (e.g., indexer 508A) has signaled to the server pod 514 (e.g., by halting heartbeat messages or using another signal) indicating its imminent maintenance, the server pod 514 allows the search to proceed even with an outdated bucket map version. This strategic approach facilitates the uninterrupted execution of any short-running searches during the graceful shutdown window on the indexer, eliminating the need to fetch different sets of bucket map versions and their associated buckets. Moreover, this method alleviates the strain on the server pod 514, preventing a surge in concurrent bucket retrieval requests from multiple indexers. Additionally, in certain implementations, the challenge posed by rolling upgrades of indexers is further addressed by imposing a limit on the number of retrieval requests that the server pod 514 can concurrently service. This measure ensures a controlled and efficient handling of retrieval requests during periods of intense upgrade activity.

In certain implementations, for optimizing the load on the server pod 514 during a rolling upgrade and minimizing the network payload exchanged within the active deployment 500, a strategic approach is employed. Rather than transmitting an entire bucket map, inclusive of all associated buckets, to an indexer at block 608 in response to a request (when the indexer lacks the cached buckets), only the delta between the buckets already cached at the indexer and the newly assigned buckets in the updated bucket map version is sent from the server pod 514 to the indexer 508. This streamlined approach significantly reduces both the computational burden on the server pod and the volume of data transmitted over the network, contributing to a more efficient and resource-conscious operation within the active deployment.

Consider three distinct scenarios highlighting differences between bucket map versions: a) the addition of partitions to the ownership list for an indexer between a prior and a current bucket map version; b) the removal of partitions from the ownership list within the same timeframe; and c)

the addition or removal of buckets from a partition common to both prior and current bucket map versions. In each scenario, the responsibility lies with the server pod 514 to gather the new buckets that the requesting indexer lacks and transmit only the buckets representing the disparity between the two bucket map versions. For cases where partitions or buckets are removed from a specific partition, the server pod 514 can efficiently communicate to the indexers to update their cached bucket map versions by either eliminating those partitions or excluding the specified buckets. This approach streamlines the process, ensuring that only necessary and differentiating information is exchanged, contributing to a more efficient management of bucket map versions within the data intake and query system.

Figure 7:
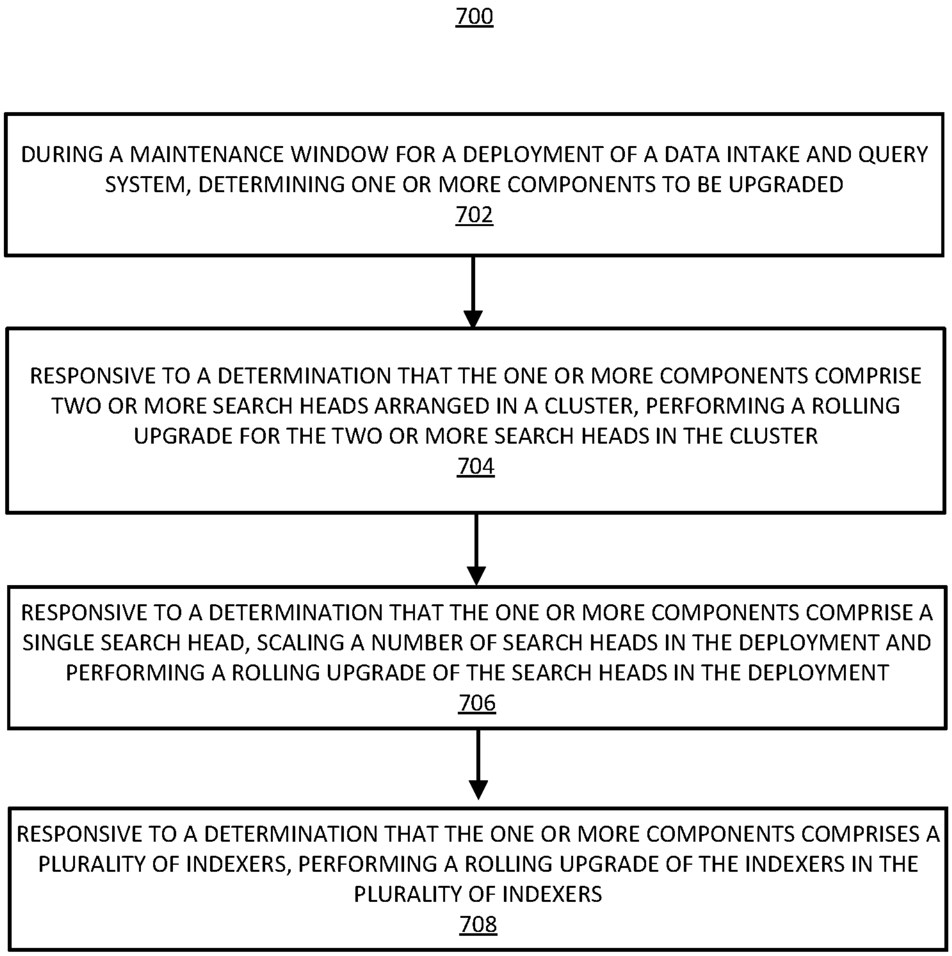
FIG. 7 is a flowchart illustrating an example of a computer-implemented method for performing maintenance to components of an active deployment of a data intake and query system to a standby deployment, in implementations according to the present disclosure.

FIG. 7 is a flowchart illustrating an example of a computer-implemented method for performing maintenance to components of an active deployment of a data intake and query system to a standby deployment, in implementations according to the present disclosure. The example process 700 can be implemented, for example, by a computing device that comprises a processor and a non-transitory computer-readable medium. The non-transitory computer readable medium can be storing instructions that, when executed by the processor, can cause the processor to perform the operations of the illustrated process 700. Alternatively, or additionally, the process 700 can be implemented using a non-transitory computer-readable medium storing instructions that, when executed by one or more processors, cause the one or more processors to perform the operations of the process 700 of FIG. 7.

At block 702, during a maintenance window, the components to be upgraded are determined during a maintenance window associated with an active deployment of a data intake and query system. For example, in some implementations, both search heads 510 and indexers 508 may need to be upgraded.

At block 704, responsive to a determination that the components to be upgraded comprise two or more search heads arranged in a cluster, a rolling upgrade is performed for the search heads in the cluster. As described above, during a rolling upgrade, each search head in the cluster is upgraded during different time windows. During this phase, the search head 510 or cluster member to be upgraded is temporarily isolated from accepting new search jobs. In some implementations, the search head 510 slated for the upgrade deregisters from the cluster. Deregistration serves to halt the redirection of additional searches to the search head undergoing maintenance, ensuring that no further searches are directed to that search head. Instead, new incoming searches are redirected to other operational members of the search head cluster, thus maintaining continuous search functionality during the upgrade process. Furthermore, for each search head being upgraded, a graceful shutdown process is applied to allow short-running searches to complete execution on the search head being upgraded. Meanwhile, long-running searches can be aborted and retried after the upgrade process.

At block 706, responsive to a determination that the component to be upgraded is a single search head, the number of search heads in the deployment can be scaled to a number higher than one (e.g., typically a single search head can be scaled to a cluster of three). For example, additional resources can be requisitioned from a cloud service provider 450 to instantiate the additional search heads. A rolling upgrade is performed, for example, for each of the three search heads in the manner described above in connection with block 704.

At block 708, responsive to a determination that the components comprise a plurality of indexers, a rolling upgrade of the indexers is performed. In some implementations, akin to the upgrade process for search heads in a search head cluster, a graceful shutdown process is applied to indexers during upgrades. For instance, short running searches, those completing within a predetermined time frame (e.g., searches that can run to completion under three minutes), are allowed to finish. Meanwhile, extended searches may be terminated and, if necessary, retried from a search head. In practical terms, this entails the search head 510 engaging in a retry process and re-transmitting the search to the indexers 508. Additionally, in some implementations, the search head 510 may redirect the search to another indexer 508 (excluding the one undergoing the upgrade) for execution.

Figure 8:
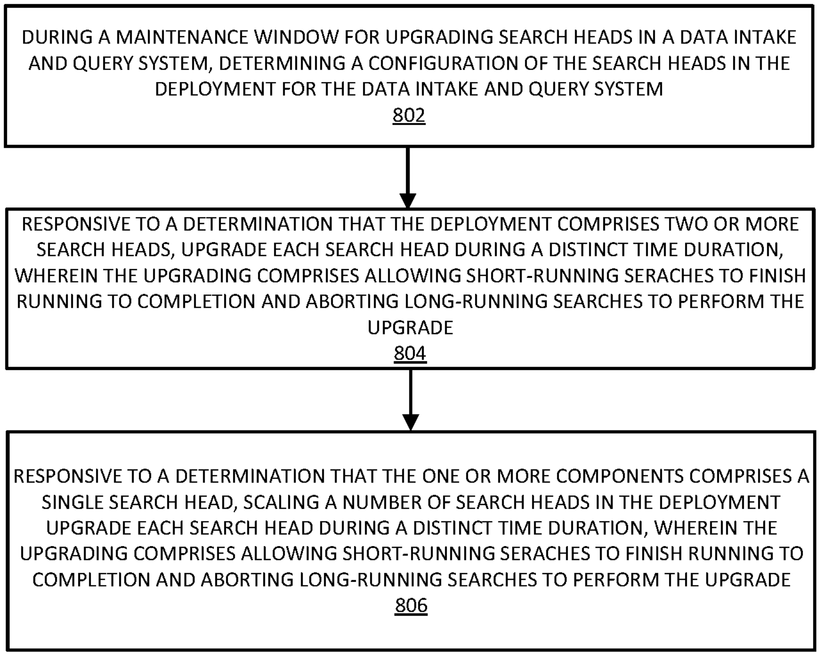
FIG. 8 is a flowchart illustrating another example of a computer-implemented method for upgrading search heads in an active deployment of a data intake and query system, in implementations according to the present disclosure.

FIG. 8 is a flowchart illustrating another example of a computer-implemented method for upgrading search heads in an active deployment of a data intake and query system, in implementations according to the present disclosure. The example process 800 can be implemented, for example, by a computing device that comprises a processor and a non-transitory computer-readable medium. The non-transitory computer readable medium can be storing instructions that, when executed by the processor, can cause the processor to perform the operations of the illustrated process 800. Alternatively, or additionally, the process 800 can be implemented using a non-transitory computer-readable medium storing instructions that, when executed by one or more processors, cause the one or more processors to perform the operations of the process 800 of FIG. 8.

At block 802, during a maintenance window, the configuration of search heads to be upgraded is determined during a maintenance window associated with an active deployment of a data intake and query system. For example, in some implementations, either a single search head or a cluster of search heads needs to be upgraded.

At block 804, responsive to a determination that the components to be upgraded comprise two or more search heads arranged in a cluster, a rolling upgrade is performed for the search heads in the cluster. As described above, during a rolling upgrade, each search head in the cluster is upgraded during different time windows. During this phase, the search head 510 or cluster member to be upgraded is temporarily isolated from accepting new search jobs. In some implementations, the search head 510 slated for the upgrade deregisters from the cluster. Deregistration serves to halt the redirection of additional searches to the search head undergoing maintenance, ensuring that no further searches are directed to that search head. Instead, new incoming searches are redirected to other operational members of the search head cluster, thus maintaining continuous search functionality during the upgrade process.

In some implementations, short running searches, those completing within a predetermined time frame (e.g., searches that can run to completion under three minutes), are allowed to finish on each search head being upgraded. Meanwhile, longer running searches may be terminated and, if necessary, retried again.

At block 806, responsive to a determination that the component to be upgraded is a single search head, the number of search heads in the deployment can be scaled to a number higher than one (e.g., typically a single search head can be scaled to a cluster of three). For example, additional resources can be requisitioned from a cloud service provider 450 to instantiate the additional search heads. A rolling upgrade is performed, for example, for each of the three search heads in the manner described above in connection with block 704.

Figure 9:
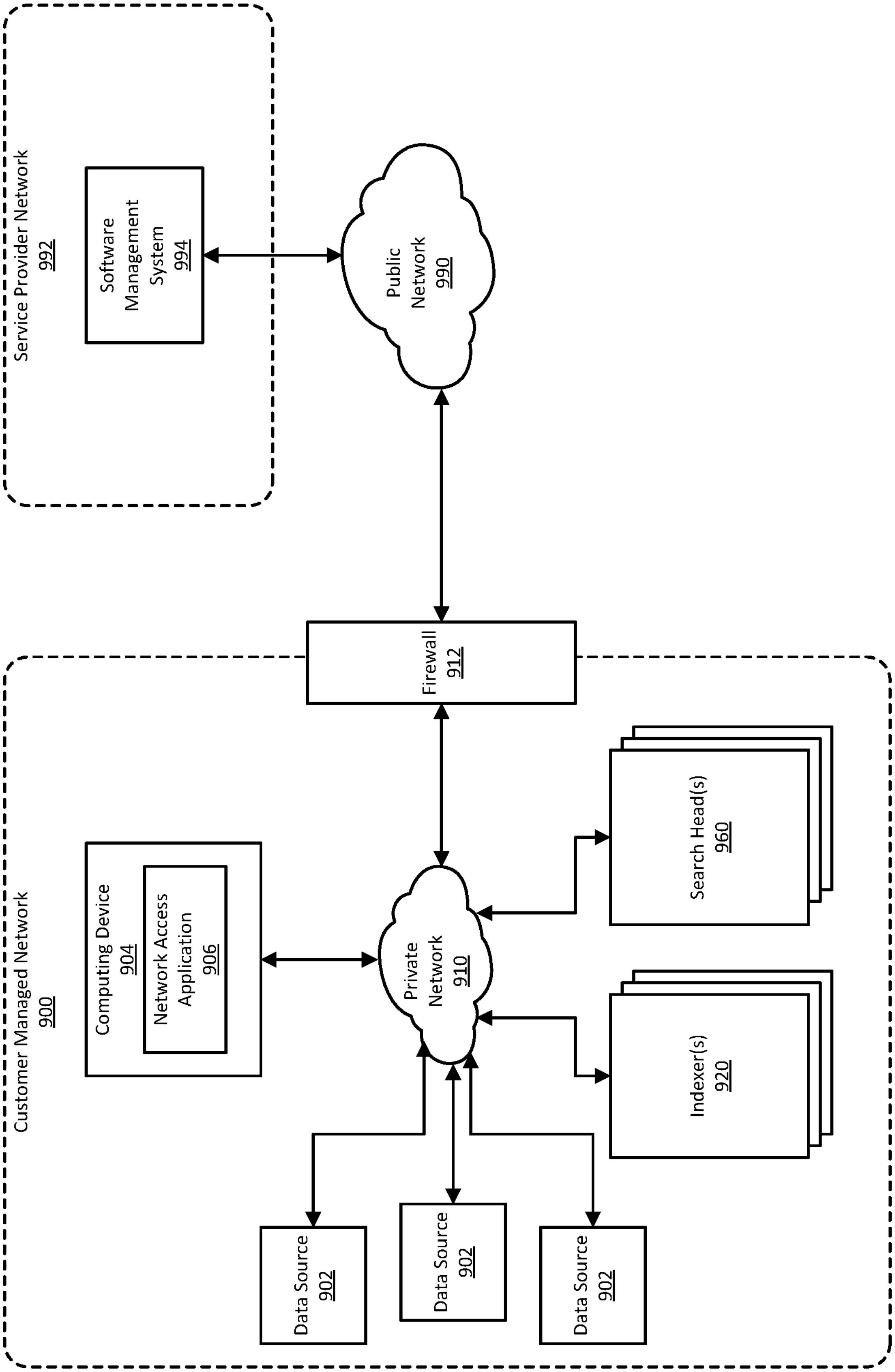
FIG. 9 illustrates an example of a self-managed network 900 that includes a data intake and query system.

FIG. 9 illustrates an example of a self-managed network 900 that includes a data intake and query system. "Self-managed" in this instance means that the entity that is operating the self-managed network 900 configures, administers, maintains, and/or operates the data intake and query system using its own compute resources and people. Further, the self-managed network 900 of this example is part of the entity's on-premise network and comprises a set of compute, memory, and networking resources that are located, for example, within the confines of an entity's data center. In some implementations, the self-managed network 900 may be substantially similar to the optional on-prem stack 408 of FIG. 4. These resources can include software and hardware resources. The entity can, for example, be a company or enterprise, a school, government entity, or other entity. Since the self-managed network 900 is located within the customer's on-prem environment, such as in the entity's data center, the operation and management of the self-managed network 900, including of the resources in the self-managed network 900, is under the control of the entity. For example, administrative personnel of the entity have complete access to and control over the configuration, management, and security of the self-managed network 900 and its resources.

The self-managed network 900 can execute one or more instances of the data intake and query system. An instance of the data intake and query system may be executed by one or more computing devices that are part of the self-managed network 900. A data intake and query system instance can comprise an indexing system and a search system, where the indexing system includes one or more indexers 920 and the search system includes one or more search heads 960.

As depicted in FIG. 9, the self-managed network 900 can include one or more data sources 902. Data received from these data sources may be processed by an instance of the data intake and query system within self-managed network 900. The data sources 902 and the data intake and query system instance can be communicatively coupled to each other via a private network 910.

Users associated with the entity can interact with and avail themselves of the functions performed by a data intake and query system instance using computing devices. As depicted in FIG. 9, a computing device 904 can execute a network access application 906 (e.g., a web browser), that can communicate with the data intake and query system instance and with data sources 902 via the private network 910. Using the computing device 904, a user can perform various operations with respect to the data intake and query system, such as management and administration of the data intake and query system, generation of knowledge objects, and other functions. Results generated from processing performed by the data intake and query system instance may be communicated to the computing device 904 and output to the user via an output system (e.g., a screen) of the computing device 904.

The self-managed network 900 can also be connected to other networks that are outside the entity's on-premise environment/network, such as networks outside the entity's data center. Connectivity to these other external networks is controlled and regulated through one or more layers of security provided by the self-managed network 900. One or more of these security layers can be implemented using firewalls 912. The firewalls 912 form a layer of security around the self-managed network 900 and regulate the transmission of traffic from the self-managed network 900 to the other networks and from these other networks to the self-managed network 900.

Networks external to the self-managed network can include various types of networks including public networks 990, other private networks, and/or cloud networks provided by one or more cloud service providers. An example of a public network 990 is the Internet. In the example depicted in FIG. 9, the self-managed network 900 is connected to a service provider network 992 provided by a cloud service provider via the public network 990.

In some implementations, resources provided by a cloud service provider may be used to facilitate the configuration and management of resources within the self-managed network 900. For example, configuration and management of a data intake and query system instance in the self-managed network 900 may be facilitated by a software management system 994 operating in the service provider network 992. There are various ways in which the software management system 994 can facilitate the configuration and management of a data intake and query system instance within the self-managed network 900. As one example, the software management system 994 may facilitate the download of software including software updates for the data intake and query system. In this example, the software management system 994 may store information indicative of the versions of the various data intake and query system instances present in the self-managed network 900. When a software patch or upgrade is available for an instance, the software management system 994 may inform the self-managed network 900 of the patch or upgrade. This can be done via messages communicated from the software management system 994 to the self-managed network 900.

The software management system 994 may also provide simplified ways for the patches and/or upgrades to be downloaded and applied to the self-managed network 900. For example, a message communicated from the software management system 994 to the self-managed network 900 regarding a software upgrade may include a Uniform Resource Identifier (URI) that can be used by a system administrator of the self-managed network 900 to download the upgrade to the self-managed network 900. In this manner, management resources provided by a cloud service provider using the service provider network 992 and which are located outside the self-managed network 900 can be used to facilitate the configuration and management of one or more resources within the entity's on-prem environment. In some implementations, the download of the upgrades and patches may be automated, whereby the software management system 994 is authorized to, upon determining that a patch is applicable to a data intake and query system instance inside the self-managed network 900, automatically communicate the upgrade or patch to self-managed network 900 and cause it to be installed within self-managed network 900.

1. In some embodiments, a computer-implemented method comprises during a maintenance window for a deployment of a data intake and query system, determining one or more components of the data intake and query system to be upgraded, responsive to a determination that the one or more components comprises a first plurality of search heads arranged in a first cluster, performing a first rolling upgrade for search heads in the first plurality of search heads in the first cluster, responsive to a determination that the one or more components comprises a single search head, scaling the single search head to a second plurality of search heads in a second cluster and performing a second rolling upgrade for search heads in the second plurality of search heads in the second cluster, and responsive to a determination that the one or more components comprises a plurality of indexers, performing a third rolling upgrade for indexers in the plurality of indexers.

2. The computer-implemented method of clause 1, wherein performing the first rolling upgrade or the second rolling upgrade comprises performing an upgrade for each of the search heads in the first plurality of search heads or the search heads in the second plurality of search heads sequentially during discrete windows of time.

3. The computer-implemented method of clauses 1 or 2, wherein performing the first rolling upgrade or the second rolling upgrade comprises performing an upgrade for each of the search heads in the first plurality of search heads or the search heads in the second plurality of search heads during discrete windows of time, wherein performing the upgrade comprises allowing short-running searches within a configurable timeout period to finish executing, aborting long-running searches exceeding the configurable timeout period, and re-initiating the long-running searches subsequent to the upgrade.

4. The computer-implemented method of any of clauses 1-3, wherein performing the first rolling upgrade or the second rolling upgrade comprises performing an upgrade for each of the search heads in the first plurality of search heads or the search heads in the second plurality of search heads during discrete windows of time, wherein performing the upgrade comprises allowing short-running searches within a configurable timeout period to finish executing, wherein the configurable timeout period is programmable by a subscriber to the data intake and query system, aborting long-running searches exceeding the configurable timeout period, and re-initiating the long-running searches subsequent to the upgrade.

5. The computer-implemented method of any of clauses 1-4, wherein performing the first rolling upgrade or the second rolling upgrade comprises performing an upgrade for each of the search heads in the first plurality of search heads or the search heads in the second plurality of search heads during discrete windows of time, wherein performing the upgrade comprises deregistering the search head from a respective cluster to prevent additional searches from being attempted on the search head, allowing short-running searches within a configurable timeout period to finish executing on the search head, aborting long-running searches exceeding the configurable timeout period, and re-initiating the long-running searches subsequent to the upgrade.

6. The computer-implemented method of any of clauses 1-5, wherein the data intake and query system comprises a cloud deployment of the data intake and query system, wherein the data intake and query system is associated with one or more stacks, and wherein each stack is dedicated to a subscriber of the data intake and query system.

7. The computer-implemented method of any of clauses 1-6, wherein the data intake and query system comprises a deployment located on a premises of a subscriber to the data intake and query system.

8. The computer-implemented method of any of clauses 1-7, wherein scaling the single search head to a second plurality of search heads in a second cluster comprises requisitioning additional computing instances to add additional search heads to the second cluster.

9. The computer-implemented method of any of clauses 1-8, wherein performing the third rolling upgrade comprises performing an upgrade for each of indexers in the plurality of indexers sequentially during discrete windows of time, wherein performing the upgrade comprises allowing short-running searches within a configurable timeout period to finish executing, wherein the configurable timeout period is programmable by a subscriber to the data intake and query system, aborting long-running searches exceeding the configurable timeout period, and re-initiating the long-running searches on a different indexer in the plurality of indexers.

10. The computer-implemented method of any of clauses 1-9, wherein performing the third rolling upgrade comprises performing an upgrade for each of indexers in the plurality of indexers sequentially during discrete windows of time, wherein performing the upgrade comprises allowing short-running searches within a configurable timeout period to finish executing, aborting long-running searches exceeding the configurable timeout period, re-initiating the long-running searches on a different indexer in the plurality of indexers, completing indexing data from one or more ingestors to one or more hot bucket slices, converting the one or more hot bucket slices to a warm bucket, and uploading the warm bucket to a scalable storage module, 11. The computer-implemented method of any of clauses 1-10, wherein performing the third rolling upgrade comprises performing an upgrade for each of indexers in the plurality of indexers sequentially during discrete windows of time, wherein performing the upgrade comprises allowing short-running searches within a configurable timeout period to finish executing, aborting long-running searches exceeding the configurable timeout period, re-initiating the long-running searches on a different indexer in the plurality of indexers, indexing data from one or more ingestors to one or more hot bucket slices, repairing one or more unfinished hot bucket slices using a different indexer from the plurality of indexers, and changing a status of the repaired one or more hot bucket slices to warm and upload to a scalable storage module using the different indexer, 12. The computer-implemented method of any of clauses 1-11, wherein performing the third rolling upgrade comprises performing an upgrade for each of indexers in the plurality of indexers sequentially during discrete windows of time, wherein performing the upgrade comprises receiving one or more short-running searches with associated bucket map identifiers, wherein at least one bucket map identifier is outdated, and permitting the one or more short-running searches with the outdated bucket map identifier to finish executing within a configurable timeout period.

13. The computer-implemented method of any of clauses 1-12, wherein performing the third rolling upgrade comprises performing an upgrade for each of indexers in the plurality of indexers sequentially during discrete windows of time, wherein performing the upgrade comprises receiving a short running search with an associated bucket map identifier from a search head, retrieving buckets associated with a bucket map corresponding to the bucket map identifier from a server pod, wherein the buckets exclude buckets previously cached at the indexer, and allowing the short-running search within a configurable timeout period to finish executing by searching the retrieved buckets and the previously cached buckets associated with the bucket map.

14. In some embodiments, a computing device comprises a processor, and a non-transitory computer-readable medium having stored thereon instructions that, when executed by the processor, cause the processor to perform operations including during a maintenance window for a deployment of a data intake and query system, determining one or more components of the data intake and query system to be upgraded, responsive to a determination that the one or more components comprises a first plurality of search heads arranged in a first cluster, performing a first rolling upgrade for search heads in the first plurality of search heads in the first cluster, responsive to a determination that the one or more components comprises a single search head, scaling the single search head to a second plurality of search heads in a second cluster and performing a second rolling upgrade for search heads in the second plurality of search heads in the second cluster, and responsive to a determination that the one or more components comprises a plurality of indexers, performing a third rolling upgrade for indexers in the plurality of indexers.

15. The computing device of clause 14, wherein performing the first rolling upgrade or the second rolling upgrade comprises performing an upgrade for each of the search heads in the first plurality of search heads or the search heads in the second plurality of search heads sequentially during discrete windows of time.

16. The computing device of clauses 14 or 15, wherein performing the first rolling upgrade or the second rolling upgrade comprises performing an upgrade for each of the search heads in the first plurality of search heads or the search heads in the second plurality of search heads during discrete windows of time, wherein performing the upgrade comprises allowing short-running searches within a configurable timeout period to finish executing, aborting long-running searches exceeding the configurable timeout period, and re-initiating the long-running searches subsequent to the upgrade.

17. The computing device of any of clauses 14-16, wherein performing the first rolling upgrade or the second rolling upgrade comprises performing an upgrade for each of the search heads in the first plurality of search heads or the search heads in the second plurality of search heads during discrete windows of time, wherein performing the upgrade comprises allowing short-running searches within a configurable timeout period to finish executing, wherein the configurable timeout period is programmable by a subscriber to the data intake and query system, aborting long-running searches exceeding the configurable timeout period, and re-initiating the long-running searches subsequent to the upgrade.

18. The computer-implemented method of any of clauses 14-17, wherein performing the first rolling upgrade or the second rolling upgrade comprises performing an upgrade for each of the search heads in the first plurality of search heads or the search heads in the second plurality of search heads during discrete windows of time, wherein performing the upgrade comprises deregistering the search head from a respective cluster to prevent additional searches from being attempted on the search head, allowing short-running searches within a configurable timeout period to finish executing on the search head, aborting long-running searches exceeding the configurable timeout period, and re-initiating the long-running searches subsequent to the upgrade.

19. The computing device of any of clauses 14-18, wherein the data intake and query system comprises a cloud deployment of the data intake and query system, wherein the data intake and query system is associated with one or more stacks, and wherein each stack is dedicated to a subscriber of the data intake and query system.

20. In some embodiments, one or more non-transitory computer-readable media store instructions that, when executed by one or more processors, cause the one or more processor to perform operations including during a maintenance window for a deployment of a data intake and query system, determining one or more components of the data intake and query system to be upgraded, responsive to a determination that the one or more components comprises a first plurality of search heads arranged in a first cluster, performing a first rolling upgrade for search heads in the first plurality of search heads in the first cluster, responsive to a determination that the one or more components comprises a single search head, scaling the single search head to a second plurality of search heads in a second cluster and performing a second rolling upgrade for search heads in the second plurality of search heads in the second cluster, and responsive to a determination that the one or more components comprises a plurality of indexers, performing a third rolling upgrade for indexers in the plurality of indexers.

21. In some embodiments, a computer-implemented method comprises during a maintenance window for a deployment of a data intake and query system, determining a configuration of one or more search heads in the data intake and query system to be upgraded, responsive to a determination that the one or more search heads comprises a plurality of search heads arranged in a first cluster, performing a first rolling upgrade for the one or more search heads in the plurality of search heads, and responsive to a determination that the one or more search heads comprises a single search head adding additional search heads to the configuration with the single search head to form a second cluster, and performing a second rolling upgrade for search heads in the second cluster.

22. The computer-implemented method of clause 21, wherein performing the first rolling upgrade or the second rolling upgrade comprises performing an upgrade for each of the search heads in the first cluster or the second cluster sequentially during discrete windows of time.

23. The computer-implemented method of clauses 21 or 22, wherein performing the first rolling upgrade or the second rolling upgrade comprises performing an upgrade for each of the search heads in the first cluster or the second cluster sequentially during discrete windows of time, wherein performing the upgrade comprises allow short-running searches within a configurable timeout period to finish executing, abort long-running searches exceeding the configurable timeout period, and re-initiate the long-running searches subsequent to the upgrade.

24. The computer-implemented method of any of clauses 21-23, wherein performing the first rolling upgrade or the second rolling upgrade comprises performing an upgrade for each of the search heads in the first cluster or the second cluster sequentially during discrete windows of time, wherein performing the upgrade comprises allow short-running searches within a configurable timeout period to finish executing, wherein the configurable timeout period is programmable by a subscriber to the data intake and query system, abort long-running searches exceeding the configurable timeout period, and re-initiate the long-running searches subsequent to the upgrade.

25. The computer-implemented method of any of clauses 21-24, wherein performing the first rolling upgrade or the second rolling upgrade comprises performing an upgrade for each of the search heads in the first cluster or the second cluster sequentially during discrete windows of time, wherein performing the upgrade comprises allow short-running searches within a configurable timeout period to finish executing, wherein the configurable timeout period is programmable by a subscriber to the data intake and query system, abort long-running searches exceeding the configurable timeout period, and re-initiate the long-running searches on an active search head in the first cluster or the second cluster.

26. The computer-implemented method of any of clauses 21-25, wherein performing the first rolling upgrade or the second rolling upgrade comprises performing an upgrade for each of the search heads in the first cluster or the second cluster sequentially during discrete windows of time, wherein performing the upgrade comprises deregister the search head from a respective cluster to prevent additional searches from being attempted on the search head, allow short-running searches within a configurable timeout period to finish executing on the search head, abort long-running searches exceeding the configurable timeout period, and re-initiate the long-running searches subsequent to the upgrade or re-initiate the long-running search on a different search head in the respective cluster.

27. The computer-implemented method of any of clauses 21-26, wherein the data intake and query system comprises a cloud deployment of the data intake and query system, and wherein the data intake and query system is associated with one or more stacks, wherein each stack is dedicated to a subscriber of the data intake and query system.

28. The computer-implemented method of any of clauses 21-27, wherein the data intake and query system comprises a deployment located on a premises of a subscriber to the data intake and query system.

29. The computer-implemented method of any of clauses 21-28, wherein adding additional search heads to the configuration with the single search head to form a second cluster comprises requisitioning additional computing instances from a cloud services provider leasing computing instances to a provider of the data intake and query system.

30. In some embodiments, a computing device comprises a processor, and a non-transitory computer-readable medium having stored thereon instructions that, when executed by the processor, cause the processor to perform operations including during a maintenance window for a deployment of a data intake and query system, determining a configuration of one or more search heads in the data intake and query system to be upgraded, responsive to a determination that the one or more search heads comprises a plurality of search heads arranged in a first cluster, performing a first rolling upgrade for the one or more search heads in the plurality of search heads, and responsive to a determination that the one or more search heads comprises a single search head adding additional search heads to the configuration with the single search head to form a second cluster, and performing a second rolling upgrade for search heads in the second cluster.

31. The computing device of clause 30, wherein performing the first rolling upgrade or the second rolling upgrade comprises performing an upgrade for each of the search heads in the first cluster or the second cluster sequentially during discrete windows of time.

32. The computing device of clauses 30 or 31, wherein performing the first rolling upgrade or the second rolling upgrade comprises performing an upgrade for each of the search heads in the first cluster or the second cluster sequentially during discrete windows of time, wherein performing the upgrade comprises allow short-running searches within a configurable timeout period to finish executing, abort long-running searches exceeding the configurable timeout period, and re-initiate the long-running searches subsequent to the upgrade.

33. The computing device of any of clauses 30-32, wherein performing the first rolling upgrade or the second rolling upgrade comprises performing an upgrade for each of the search heads in the first cluster or the second cluster sequentially during discrete windows of time, wherein performing the upgrade comprises allow short-running searches within a configurable timeout period to finish executing, wherein the configurable timeout period is programmable by a subscriber to the data intake and query system, abort long-running searches exceeding the configurable timeout period, and re-initiate the long-running searches subsequent to the upgrade.

34. The computing device of any of clauses 30-33, wherein performing the first rolling upgrade or the second rolling upgrade comprises performing an upgrade for each of the search heads in the first cluster or the second cluster sequentially during discrete windows of time, wherein performing the upgrade comprises allow short-running searches within a configurable timeout period to finish executing, wherein the configurable timeout period is programmable by a subscriber to the data intake and query system, abort long-running searches exceeding the configurable timeout period, and re-initiate the long-running searches on an active search head in the first cluster or the second cluster.

35. The computing device of any of clauses 30-34, wherein the first rolling upgrade or the second rolling upgrade comprises performing an upgrade for each of the search heads in the first cluster or the second cluster sequentially during discrete windows of time, wherein performing the upgrade comprises deregister the search head from a respective cluster to prevent additional searches from being attempted on the search head, allow short-running searches within a configurable timeout period to finish executing on the search head, abort long-running searches exceeding the configurable timeout period, and re-initiate the long-running searches subsequent to the upgrade or re-initiate the long-running search on a different search head in the respective cluster.

36. The computing device of any of clauses 30-35, wherein the data intake and query system comprises a cloud deployment of the data intake and query system, wherein the data intake and query system is associated with one or more stacks, and wherein each stack is dedicated to a subscriber of the data intake and query system.

37. The computing device of any of clauses 30-36, wherein the data intake and query system comprises a deployment located on a premises of a subscriber to the data intake and query system.

38. The computing device of any of clauses 30-37, wherein adding additional search heads to the configuration with the single search head to form a second cluster comprises requisitioning additional computing instances from a cloud services provider leasing computing instances to a provider of the data intake and query system.

39. In some embodiments, a non-transitory computer-readable medium having stored thereon instructions that, when executed by one or more processors, cause the one or more processor to perform operations including during a maintenance window for a deployment of a data intake and query system, determining a configuration of one or more search heads in the data intake and query system to be upgraded, responsive to a determination that the one or more search heads comprises a plurality of search heads arranged in a first cluster, performing a rolling upgrade process for the one or more search heads in the plurality of search heads, and responsive to a determination that the one or more search heads comprises a single search head adding additional search heads to the configuration with the single search head to form a second cluster, and performing a rolling upgrade process for the search heads in the second cluster.

40. The non-transitory computer-readable medium of clause 39, wherein the data intake and query system comprises a deployment located on a premises of a subscriber to the data intake and query system.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

The invention claimed is:

1. A computer-implemented method, comprising:

during a maintenance window for a deployment of a data intake and query system, determining a configuration of one or more search heads in the data intake and query system to be upgraded;

responsive to a determination that the one or more search heads comprises a plurality of search heads arranged in a first cluster, performing a first rolling upgrade for the one or more search heads in the plurality of search heads; and responsive to a determination that the one or more search heads comprises a single search head:

adding additional search heads to the configuration with the single search head to form a second cluster, and performing a second rolling upgrade for search heads in the second cluster, wherein performing the second rolling upgrade includes:

allowing a short-running search within a timeout period to finish executing; and aborting a long-running search exceeding the timeout period, wherein the long-running search is re-initiated subsequent to the second rolling upgrade.

2. The computer-implemented method of claim 1, wherein performing the first rolling upgrade or the second rolling upgrade comprises:

performing an upgrade for each of the search heads in the first cluster or the second cluster sequentially during discrete windows of time.

3. The computer-implemented method of claim 1, wherein performing the first rolling upgrade comprises:

performing an upgrade for each of the search heads in the first cluster sequentially during discrete windows of time, wherein performing the upgrade comprises:

allow short-running searches within a configurable timeout period to finish executing;

abort long-running searches exceeding the configurable timeout period; and re-initiate the long-running searches subsequent to the upgrade.

4. The computer-implemented method of claim 1, wherein the timeout period comprises a configurable timeout period that is programmable by a subscriber to the data intake and query system.

5. The computer-implemented method of claim 1, wherein the long-running search is re-initiated on an active search head in the second cluster.

6. The computer-implemented method of claim 1, wherein performing the first rolling upgrade comprises:

performing an upgrade for each of the search heads in the first cluster sequentially during discrete windows of time, wherein performing the upgrade comprises:

deregister the search head from the first cluster to prevent additional searches from being attempted on the search head;

allow short-running searches within a configurable timeout period to finish executing on the search head;

abort long-running searches exceeding the configurable timeout period; and re-initiate the long-running searches subsequent to the upgrade or re-initiate the long-running search on a different search head in the respective cluster.

7. The computer-implemented method of claim 1, wherein the data intake and query system comprises a cloud deployment of the data intake and query system, and wherein the data intake and query system is associated with one or more stacks, wherein each stack is dedicated to a subscriber of the data intake and query system.

8. The computer-implemented method of claim 1, wherein the data intake and query system comprises the deployment located on a premises of a subscriber to the data intake and query system.

9. The computer-implemented method of claim 1, wherein adding the additional search heads to the configuration with the single search head to form the second cluster comprises requisitioning additional computing instances from a cloud services provider leasing computing instances to a provider of the data intake and query system.

10. A computing device, comprising:

a processor; and a non-transitory computer-readable medium having stored thereon instructions that, when executed by the processor, cause the processor to perform operations including:

during a maintenance window for a deployment of a data intake and query system, determining a configuration of one or more search heads in the data intake and query system to be upgraded;

responsive to a determination that the one or more search heads comprises a plurality of search heads arranged in a first cluster, performing a first rolling upgrade for the one or more search heads in the plurality of search heads; and responsive to a determination that the one or more search heads comprises a single search head:

adding additional search heads to the configuration with the single search head to form a second cluster, and performing a second rolling upgrade for search heads in the second cluster, wherein performing the second rolling upgrade includes:

allowing a short-running search within a timeout period to finish executing; and aborting a long-running search exceeding the timeout period, wherein the long-running search is re-initiated subsequent to the second rolling upgrade.

11. The computing device of claim 10, wherein performing the first rolling upgrade or the second rolling upgrade comprises:

performing an upgrade for each of the search heads in the first cluster or the second cluster sequentially during discrete windows of time.

12. The computing device of claim 10, wherein performing the first rolling upgrade comprises:

performing an upgrade for each of the search heads in the first cluster sequentially during discrete windows of time, wherein performing the upgrade comprises:

allow short-running searches within a configurable timeout period to finish executing;

abort long-running searches exceeding the configurable timeout period; and re-initiate the long-running searches subsequent to the upgrade.

13. The computing device of claim 10, wherein performing the timeout period comprises a configurable timeout period that is programmable by a subscriber to the data intake and query system.

14. The computing device of claim 10, wherein the long-running search is re-initiated on an active search head in the second cluster.

15. The computing device of claim 10, wherein the first rolling upgrade or the second rolling upgrade comprises:

performing an upgrade for each of the search heads in the first cluster sequentially during discrete windows of time, wherein performing the upgrade comprises:

deregister the search head from the first cluster to prevent additional searches from being attempted on the search head;

allow short-running searches within a configurable timeout period to finish executing on the search head;

abort long-running searches exceeding the configurable timeout period; and re-initiate the long-running searches subsequent to the upgrade or re-initiate the long-running search on a different search head in the respective cluster.

16. The computing device of claim 10, wherein the data intake and query system comprises a cloud deployment of the data intake and query system, wherein the data intake and query system is associated with one or more stacks, and wherein each stack is dedicated to a subscriber of the data intake and query system.

17. The computing device of claim 10, wherein the data intake and query system comprises the deployment located on a premises of a subscriber to the data intake and query system.

18. The computing device of claim 10, wherein adding the additional search heads to the configuration with the single search head to form the second cluster comprises requisitioning additional computing instances from a cloud services provider leasing computing instances to a provider of the data intake and query system.

19. A non-transitory computer-readable medium having stored thereon instructions that, when executed by one or more processors, cause the one or more processor to perform operations including:

during a maintenance window for a deployment of a data intake and query system, determining a configuration of one or more search heads in the data intake and query system to be upgraded;

responsive to a determination that the one or more search heads comprises a plurality of search heads arranged in a first cluster, performing a rolling upgrade process for the one or more search heads in the plurality of search heads; and responsive to a determination that the one or more search heads comprises a single search head:

adding additional search heads to the configuration with the single search head to form a second cluster, and performing a second rolling upgrade for search heads in the second cluster, wherein performing the second rolling upgrade includes:

allowing a short-running search within a timeout period to finish executing; and aborting a long-running search exceeding the timeout period, wherein the long-running search is re-initiated subsequent to the second rolling upgrade.

20. The non-transitory computer-readable medium of claim 19, wherein the data intake and query system comprises the deployment located on a premises of a subscriber to the data intake and query system.

* * * * *